(12) United States Patent
Li

(10) Patent No.: US 12,233,362 B2
(45) Date of Patent: Feb. 25, 2025

(54) ENERGY SAVING AND EMISSION REDUCTION SYSTEM FOR CHEMICAL SEPARATION AND PURIFICATION PROCESS

(71) Applicant: Beijing University of Chemical Technology, Beijing (CN)

(72) Inventor: Qunsheng Li, Beijing (CN)

( * ) Notice: Subject to any disclaimer, the term of this patent is extended or adjusted under 35 U.S.C. 154(b) by 6 days.

(21) Appl. No.: 18/113,067

(22) Filed: Feb. 23, 2023

(65) Prior Publication Data

US 2023/0191277 A1    Jun. 22, 2023

(30) Foreign Application Priority Data

Dec. 27, 2022    (CN) .......................... 202211689840.4

(51) Int. Cl.
*B01D 3/14*    (2006.01)
*B01D 3/00*    (2006.01)
*B01D 3/32*    (2006.01)
*B01D 3/42*    (2006.01)

(52) U.S. Cl.
CPC ............. *B01D 3/007* (2013.01); *B01D 3/145* (2013.01); *B01D 3/322* (2013.01); *B01D 3/42* (2013.01)

(58) Field of Classification Search
CPC ........ B01D 3/007; B01D 3/145; B01D 3/322; B01D 3/42
See application file for complete search history.

(56) References Cited

U.S. PATENT DOCUMENTS

| | | | | |
|---|---|---|---|---|
| 3,855,074 A | * | 12/1974 | Mosler | B01D 3/4255 700/270 |
| 4,166,770 A | * | 9/1979 | Anderson | G06G 7/58 700/270 |
| 4,230,534 A | * | 10/1980 | Stewart | B01D 3/425 700/270 |
| 4,367,121 A | * | 1/1983 | Furr | B01D 3/4222 700/270 |
| 5,260,865 A | * | 11/1993 | Beauford | B01D 3/425 700/270 |
| 5,616,289 A | * | 4/1997 | Maeda | B01F 25/4323 261/112.2 |
| 6,088,630 A | * | 7/2000 | Cawlfield | G05B 17/02 700/270 |

(Continued)

*Primary Examiner* — Jonathan Miller

(57) ABSTRACT

An energy saving and emission reduction system for chemical separation and purification process is disclosed. The chemical separation and purification process includes a synthesis section and/or a distillation section and/or a recovery section. The energy saving and emission reduction system includes an energy comprehensive utilization maximizing energy saving module. The energy comprehensive utilization maximizing energy saving module comprehensively evaluates the chemical separation and purification process, and acquires a lowest energy consumption value according to initial and final material flow parameters. Then energy integration optimization and energy saving technical modification are performed on the synthesis section and/or distillation section and/or recovery section according to the lowest energy consumption value. The disclosure involves a comprehensive and extensive energy saving and emission reduction system for chemical separation and purification process, and has achieved good environmental benefits.

5 Claims, 8 Drawing Sheets

(56) References Cited

U.S. PATENT DOCUMENTS

| | | | | |
|---|---|---|---|---|
| 6,751,527 | B2* | 6/2004 | Herzog | C10G 7/12 |
| | | | | 210/143 |
| 9,925,476 | B2* | 3/2018 | Crawford | B01D 3/007 |
| 9,925,477 | B2* | 3/2018 | Crawford | B01D 1/0058 |
| 10,095,200 | B2* | 10/2018 | Horn | C10G 35/24 |
| 10,534,329 | B2* | 1/2020 | Horn | C10G 7/12 |
| 11,225,444 | B2* | 1/2022 | Al-Dughaiter | C07C 11/08 |
| 11,459,512 | B1* | 10/2022 | Lee | C10G 7/12 |
| 11,766,625 | B2* | 9/2023 | Pan | C10G 7/12 |
| | | | | 202/159 |
| 2005/0040026 | A1* | 2/2005 | Grub | B01D 3/40 |
| | | | | 203/1 |
| 2011/0120422 | A1 | 5/2011 | Hou | |
| 2011/0161131 | A1 | 6/2011 | Takahashi et al. | |
| 2013/0270157 | A1* | 10/2013 | Ferrara | C10G 45/02 |
| | | | | 208/48 AA |
| 2015/0143806 | A1* | 5/2015 | Friesth | F01K 13/02 |
| | | | | 220/592.2 |
| 2016/0045841 | A1 | 2/2016 | Kaplan et al. | |
| 2018/0046155 | A1* | 2/2018 | Horn | G05B 13/048 |
| 2018/0353927 | A1* | 12/2018 | Nieuwoudt | B01J 19/32 |
| 2018/0355258 | A1* | 12/2018 | Cross | C10G 31/08 |
| 2020/0108327 | A1* | 4/2020 | Ohaco | G01N 30/02 |
| 2021/0348066 | A1* | 11/2021 | Clark | B01J 8/1836 |
| 2022/0016543 | A1* | 1/2022 | Crawford | B01D 1/2884 |
| 2022/0299952 | A1* | 9/2022 | Salhov | G05B 13/027 |
| 2022/0331710 | A1* | 10/2022 | Karaki | B01D 3/4211 |
| 2023/0191277 | A1* | 6/2023 | Li | B01D 3/42 |
| | | | | 203/25 |

* cited by examiner

ENERGY SAVING AND EMISSION REDUCTION SYSTEM FOR CHEMICAL SEPARATION AND PURIFICATION PROCESS

CROSS REFERENCE TO RELATED APPLICATION

This patent application claims the benefit and priority of Chinese Patent Application No. 202211689840.4 filed on Dec. 27, 2022, the disclosure of which is incorporated by reference herein in its entirety as part of the present application.

TECHNICAL FIELD

The present disclosure relates to the technical field of chemical separation and purification, and more specifically, to an energy saving and emission reduction system for chemical separation and purification process.

BACKGROUND ART

The action taken by the carbon neutrality target in response to global climate change highlights the responsibilities, and is of great significance to global sustainable development. Carbon neutrality means that carbon emissions resulting from economic social activities is equal to the amount of carbon dioxide offset by commercial carbon sinks and other activities and carbon dioxide absorbed from the air. Since it is impossible not to emit carbon dioxide in actual production and life, the concept of "carbon neutrality" in fact achieves a net carbon emission close to zero by increasing carbon absorption or reducing carbon emission to offset its own carbon emission.

In Chinese national civil economy, the chemical industry has an important position, separation and purification techniques are an important branch of chemical process, and are widely used in multiple fields such as chemical engineering, petrochemical, medicine, information, materials and other fields, and play a very important role in economic benefits and environmental benefits of production processes.

Distillation technology in the chemical industry is an important branch of mass transfer and separation engineering. From the refining of raw materials, the separation of intermediate products, the purification of products, the treatment of wastes, the recovery of useful substances and other production links, from chemical, petrochemical, biochemical, pharmaceutical, materials, light industry to environmental protection, information, food, energy and other fields, all rely on distillation technology. Distillation techniques play a vital role in economic viability, product quality, environmental impact and safety and reliability of the industrial process.

There are two approaches to achieve carbon neutrality. One approach is to increase carbon absorption. Currently, the mainstream practice is to perform large scale plantation and construction or establish an industrial absorption device for carbon dioxide. The second one is to reduce carbon emission, and energy conservation through a chemical process is an important method for reducing carbon emission. For a chemical industry separation process, especially a distillation process, energy consumption mainly is carbon-based energy. Thermodynamic studies show that the useful work (exergy) in the distillation process is only about 5%, and the remaining 95% of the thermal energy is carried away by the cooling water at the top of the tower. The high-temperature emission material at the bottom has a high enthalpy of heat, high energy consumption, and needs to be recycled.

Therefore, in order to achieve the comprehensive energy consumption and the significant reduction of raw material energy consumption in the production process, and to improve the energy utilization rate and reduce carbon emissions as a whole, an energy saving and emission reduction system for chemical separation and purification process is provided.

SUMMARY

In view the above, the disclosure provides an energy saving and emission reduction system for chemical separation and purification process, which involves a comprehensive and extensive energy saving and emission reduction system for chemical separation and purification process, and is suitable for the research and development of key technologies for energy saving and emission reduction in chemical separation and purification process under the background of carbon neutrality, and has achieved good environmental benefits. The energy saving and emission reduction system for chemical separation and purification process provided by the disclosure can not only make full and reasonable use of energy, reduce energy consumption, recover useful gas, afterheat, water resources and raw materials, but also reduce the discharge of waste water, waste gas and waste heat in the production process, and make outstanding contributions in reducing the discharge of greenhouse gases.

In order to achieve the above purpose, technical solutions of the present disclosure are specifically described as follows.

An energy saving and emission reduction system for chemical separation and purification process is provided, and the chemical separation and purification process includes a synthesis section and/or a distillation section and/or a recovery section. The energy saving and emission reduction system includes an energy comprehensive utilization maximizing energy saving module.

Wherein, the energy comprehensive utilization maximizing energy saving module comprehensively evaluates the chemical separation and purification process, and acquires a lowest energy consumption value according to initial and final material flow parameters.

Then energy integration optimization and energy saving technical modification are performed on the synthesis section and/or distillation section and/or recovery section according to the lowest energy consumption value.

The energy saving technical modification of the synthesis section includes a heat pipe energy saving module and a multistage heat exchange energy saving module;

The energy saving technical modification of the distillation section includes a high-efficiency tray, a packing equipment energy saving module, an ionic liquid extractive distillation technology and gas-liquid phase equilibrium energy saving module, and a distillation operation process energy saving module.

The energy saving technical modification of the recovery section includes a high-efficiency tray packing equipment energy saving module, a distillation system heat integration energy saving module, a distillation operation process energy saving optimization module, and a distillation system automatic control and optimization module.

Preferably, the energy comprehensive utilization maximizing energy saving module is to design and construct an energy recovery maximizing network mathematical model, and to perform energy integration optimization on a complex energy distribution and a cold-hot material flow energy utilization rate in the distillation process.

Further, the energy comprehensive utilization maximizing energy saving module constructs a network that can not only meet the initial and final material flow temperatures, but also has the lowest utility consumption, which provides theoretical support for the energy saving optimization of the distillation process.

Based on the "MEU model", a multi-level and multi-dimensional system optimization scheme for distillation process is proposed, and an energy comprehensive utilization network is built to significantly reduce the energy consumption of distillation industry, and promote the high-quality, long-term, green and stable development of distillation industry. For large chemical processes, the distillation energy distribution is complex, and the cold-hot material flow energy utilization rate is low. The disclosure solves the problem that the current process optimization technology is difficult to fully cover all working conditions. Through the MEU network mathematical model, the limitations of the original process optimization method that is too simple and not comprehensive are broken, and a heat exchange network that can not only meet the heat exchange demand, but also minimize the number of utilities and heat exchangers is constructed.

Preferably, the heat pipe energy saving module is to add a heat pipe heat exchanger outside a pipe connecting a reactor and a gas separation tower, and the heat pipe heat exchanger is provided with convex teeth outside a gas pipe to increase a heat exchange area.

Or, an optimization is performed on a traditional direct heat pipe structure to obtain a heat pipe heat exchanger with a novel structure.

The heat pipe heat exchanger with a novel structure is an inverted U-shaped pipe, and an upper part of the inverted U-shaped pipe is a condensation section. A condensate flows along a wall of the inverted U-shaped pipe and flows to an evaporation section at a lower part of the inverted U-shaped pipe under the action of gravity, and the condensate absorbs heat in the evaporation section and evaporates into steam, and is then raised to the condensation section for re-condensation.

Further, the working substance in the evaporation section will boil or evaporate after being heated, absorb the heat of external heat source, generate latent heat of vaporization, and change from liquid to steam. The generated steam flows to the condensation section under the action of a certain pressure difference in the pipe, then meets the cold wall surface and external cold source, and condenses into a liquid. At the same time, it releases the latent heat of vaporization, and transmits it to the external cold source through the pipe wall. The condensate returns to the evaporation section by gravity (or wick) and evaporates again. In this way, heat transfer and exchange between the external cold and hot media can be realized. Due to its extremely high heat transfer coefficient, the heat pipe heat exchanger reduces the temperature difference between the cooling medium and the material, and improves the heat transfer efficiency. Typical heat pipe structure mainly includes shell, wick and working substance that can flow in the pipe. This module improves the structure of the heat pipe from the original straight pipe to the inverted U-shaped pipe. The upper part of the inverted U-shaped pipe is the condensation section, where the rising steam releases heat and condenses into condensate. The condensate flows along the inverted U-shaped pipe wall and under the action of gravity to the evaporation section at the lower part of the inverted U-shaped pipe. The condensate absorbs heat in the evaporation section and vaporizes into steam and rises to the condensation section for re-condensation, effectively expanding the heat exchange area, further reducing the quality of the heat exchange medium, and at the same time, it is more suitable for the heat exchange of minimal temperature difference heat pipes of industrial scale.

The multistage heat exchange energy saving module provides multiple grades of cold sources at the same time in the whole distillation system, and uses cold energy in a cascade way to reduce an exergy loss caused by heat exchange.

Further, chemical processes often produce fluids with very low temperature and high energy grade. If it is directly applied to fields that do not need such low temperature, it will inevitably cause a lot of exergy loss in the heat exchange process, which is unreasonable from the perspective of effective energy utilization. Therefore, cascade utilization of cold energy and reduction of exergy loss are very important. The refrigerant has grade. The lower the evaporation temperature, the higher the grade of the refrigerant and the greater the work loss. The greater the temperature difference between the cooled material and the refrigerant, the greater the work loss. The disclosure provides multiple grades of cold sources at the same time, reduces the exergy loss in the heat exchange process, and greatly reduces the operating costs and equipment costs. At the same time, through the comparison between the five-stage cascade condensation and the two-stage cascade condensation, the usage of the ultra-low temperature refrigerant is reduced by more than 70% by the five-stage cascade condensation.

Preferably, the high-efficiency tray and packing equipment energy saving module includes an FTP-type tray distillation energy saving module and an LPD packing distillation energy saving equipment module.

The FPT-type tray distillation energy saving module and the high-efficiency tray and packing equipment energy saving module are both verified by a mass transfer mechanism and a gas-liquid flow experiment on a tray, and a common tray is replaced or an FPT-type tray structure is optimized.

And, an FPT-type tray structure is formed by combining a guide hole, a trapezoidal cap cover and a packing.

Further, in order to overcome the problem that the pressure drop of ordinary tray packing is too high, resulting in the excessive temperature difference between the top and bottom of the tower, resulting in the waste of energy, a flow-guided trapezoid spray-packing tray (FPT) suitable for large flux is developed. The structural feature of the tray is that the opening area on the tray is provided with a guide hole with a slot direction consistent with the flow direction of the liquid phase, and the gas from the tower kettle is blown out horizontally from its trapezoidal slot through the guide hole, forming a parallel flow with the liquid advancing on the tray, which is conducive to the forward flow of the liquid and the reduction of the liquid level gradient, thus reducing the pressure drop.

In addition, the guide hole is opened in the arc-shaped area along the tangential direction of the tray arc, which effectively avoids the mass transfer dead zone and gas-liquid backmixing phenomenon that are easy to occur in this area. At the inlet of the liquid phase, a bubbling promoter with inclined upward bulge is installed. This structure is mainly used to reduce the liquid level gradient at both ends of the inlet and outlet of the liquid phase, so that the liquid phase can rapidly contact the gas phase blown out by the guide hole for mass transfer after entering the tray from top to bottom, which eliminates the non-activated zone at the upstream of the tray. In addition, rectangular holes with the same size are opened on the tray, and cap covers in the shape of trapezoid-rectangle are installed on the holes. The side wall of the cap cover is at a certain angle with the vertical direction, and the cross-sectional area is gradually reduced. After the liquid enters the cover from the bottom gap, it is lifted under the action of gas. The upper part of the cap cover is a semi-open structure, which solves the pressure suppression problem of the three-dimensional tray and reduces the pressure drop. Mellapak 250 structured packing is installed to increase the gas-liquid contact area and improve the mass transfer efficiency of the tray. The separation plate above the packing can intercept the liquid droplets to a certain extent and reduce the entrainment of mist.

The LPD packing distillation energy saving equipment module establishes a CFD multi-scale model and optimizes a gas-liquid phase flow in the packing to guide and improve the LPD packing structure.

The LPD packing structure is formed by vertically two segments of vertical straight line segments and corrugated plates of which a middle inclination angle changes continuously, and the changing middle inclination angle of the corrugated plates segments is divided into three types: A, B and C, in which the changes of the inclination angle of the corrugations are respectively: 30°-40°-30°, 30°-37.5°-30°, 30°-35°-30°, and a height of the straight line segments at the upper and lower ends is ⅛ of a height of a packing layer, the vertical height corresponding to each section of corrugation in the middle part is ⅔ of the packing height, and each broken line connection is connected with a smooth arc to reduce the dead zone of gas-liquid flow.

By changing the shape of the corrugations at the upper and lower ends of the packing, the gas-liquid flow condition between the two adjacent layers of packing can be effectively improved, and the gas-liquid flow resistance can be reduced. At the same time, the changing inclination angles of the corrugations enhance the turbulence of gas-liquid flow, promotes the renewal of the liquid film on the surface of the packing, strengthens the mass transfer process, effectively improves the flow condition between the two layers of packing, reduces the gas-liquid flow resistance, significantly reduces the pressure drop of the packing layer, lowers the tower kettle temperature, and realizes heat exchange energy conservation.

Preferably, the ionic liquid extractive distillation technology and gas-liquid phase equilibrium energy saving module includes an ionic liquid extractive distillation energy saving module and a gas-liquid phase equilibrium energy saving module.

Further, in chemical production, it is often encountered that the relative volatility between the separated components is close to 1 or the material system forms azeotrope, which can not be separated by ordinary distillation, and special distillation technology needs to be adopted. If the added new component cannot form an azeotrope with any component in the original material system, and its boiling point is higher than that of the original component, it leaves the distillation tower from the tower kettle, and this kind of special distillation is called extractive distillation. Therefore, selecting suitable extractant can make the separation process achieve twice the result with half the effort. Traditional extractive distillation uses organic solvent as extractant, which is large in amount and volatile, will pollute the environment, and the problem of high energy consumption is more and more obvious. The physical characteristics of the ionic liquid developed by this module just solve the above problems. A new ionic liquid is select as the extractant, the azeotropic point in the original material system is destroyed, and the purpose of separating azeotropes is achieved, which significantly reduce the energy consumption of azeotrope separation, and significantly reduce the equipment investment.

The ionic liquid extractive distillation energy saving module performs theoretical research and data analysis on the basis of an existing extractant, acquires an ionic liquid as a novel green extractant and verifies same, and at the same time, measures gas-liquid equilibrium data thereof.

The gas-liquid phase equilibrium energy saving module uses an azeotropic binary system gas-liquid phase equilibrium data as a basis, and adds an ionic liquid as a novel extractant to constitute ternary system VLE data. Specifically, the gas-liquid phase equilibrium energy saving module relates the binary and ternary gas-liquid phase equilibrium data by using Wilson, NRTL, UNIQUAC or UNIFAC models, acquires a feasibility data of an ionic liquid as a novel extractant, performs a process flow simulation, completes a process optimization, and determines an optimal distillation operating parameter.

Further, the gas-liquid phase equilibrium energy saving module mainly studies the VLE data of azeotropic binary system at atmospheric pressure (101.3 kPa), verifies the reliability of experimental instruments and equipment, and studies the VLE data of ternary system after adding ionic liquid. Three activity coefficient models, Wilson, NRTL and UNIQUAC, are adopted to correlate binary and ternary gas-liquid equilibrium data, explore the feasibility of separating binary azeotrope system by ionic liquid extractive distillation, and simulate the process flow. The process optimization is completed with the minimum total annual cost (TAC) as the objective function to determine the best operating parameters.

The ionic liquid extractive distillation technology and gas-liquid phase equilibrium energy saving module further includes a solid-liquid phase equilibrium module. The solid-liquid phase equilibrium module measures a solubility data of the investigated material system by experiment, and on this basis, performs a predictive calculation on the solubility data of the target material system and model correction, and improves a predictive effect of the model by using a classical thermodynamic mode.

Further, the solid-liquid phase equilibrium module selects the material system with practical significance and less research, fills in the blank of solid-liquid phase equilibrium of the studied system in multiphase solution by solubility data measured by experiment, and enriches the chemical database. A classical thermodynamic model is adopted to perform prediction calculation on solubility data of the target material system. By modifying the model, the prediction effect of the model is improved, so that the model is more practical and has a stronger prediction capability, thereby providing a theoretical foundation for industrial applications.

Preferably, the distillation operation process energy saving module and the distillation operation process energy saving optimization module are mainly an optimization of the internal and system energy saving innovation of a distillation tower. Specifically, a multi-level and multi-dimensional system optimization structure is first established on the basis of a single factor, and at the same time, the optimization of all factors in a distillation tower is completed, on the premise of guaranteeing the purity of a product, an operating point of minimum energy consumption is obtained.

Wherein, the single factor mainly includes: an optimal number of trays NT, an optimal feed position NF, an optimal feed quantity F, an optimal reflux ratio RR, an optimal operating pressure P and an optimal feed state.

Preferably, the distillation system heat integration energy saving module is an optimization of the internal and system energy saving of a distillation tower, that is, heat integration between a top condenser and a bottom reboiler,
- or heat integration between a condenser, a reboiler, and a heat source external to the system;
- or heat integration between one distillation tower top condenser and another distillation tower intermediate reboiler.

Further, the distillation system heat integration energy saving module is one of the effective ways to fully utilize the energy in the system, and is an extremely effective energy saving technology. Compared with multi-effect distillation and thermally coupled distillation, which are more energy saving than ordinary distillation, the system heat integration distillation energy saving technology is more applicable to production systems such as ordinary heat exchange network system, distillation system, reaction system and utility system, and the energy saving effect is very significant. About the distillation system heat integration method, it can be the heat integration between a top condenser and a bottom reboiler, or the heat integration between a condenser, a reboiler, and a heat source external to the system, or heat integration between one distillation tower top condenser and another distillation tower intermediate reboiler, so as to save the circulating water, cooling water and water steam.

The distillation system automatic control and optimization module performs a dynamic control analysis on the distillation tower, compares dynamic disturbance conditions of different distillation tower control structures after disturbance occurs according to a feed quantity and feed composition, determines an optimal solution, and then establishes a distillation tower dynamic control mathematical model having a double-end control with a fast response speed and a small fluctuation, and at the same time, establishes a dynamic function compensation model for a liquid level at the bottom of the tower, and takes the feed quantity of the tower as a feed-forward signal.

The distillation tower dynamic control mathematical model has a two-terminal control method with fast response and small fluctuation. A dynamic function compensation model for the liquid level at the tower bottom is established, and the feed quantity of the tower is used as the feed-forward signal to enhance the robustness of the system. Aiming at the problems of poor control performance and large deviation of product purity in traditional single-terminal control or dual-temperature control, a component-temperature control structure that simultaneously interlocks product purity and temperature is proposed. The analyzer control can provide direct and correct product composition control, but it is expensive, complicated to maintain and large measurement lag. The temperature control has the problem of large fluctuation of product composition. The component-temperature control structure overcomes the disadvantages of analyzer control and temperature control. The component-temperature control structure transmits the product purity signal and temperature signal to the software for analysis at the same time to complete online correction. The component-temperature control structure has realized the advantages of fast response, high accuracy and small disturbance, which greatly reduces the "safe interval" of distillation, and can save 10%-13% energy on the original basis.

Preferably, the multistage heat exchange energy saving module further includes: a heat pump distillation energy saving module and a distillation intermediate heat exchange energy saving module.

The heat pump distillation energy saving module, which improves on a traditional heat pump distillation process, adds a heat exchanger on a top steam pipeline before a compressor, leads out a branch at a liquid outlet end of an discharge material from a tower kettle to serve as a heat exchange medium of the heat exchanger, and uses a residual heat in the discharge material from the tower kettle to heat the top steam. By exchanging heat between the discharge material of the tower kettle and the top material flow, a temperature of top steam is increased, a temperature difference between the tower top and the tower kettle is reduced, and at the same time, the top steam is separated from a saturated state to achieve energy saving.

Specifically, the technical core of the heat pump distillation energy saving module is the reverse Carnot cycle. After using the heat pump distillation technology, it is almost unnecessary to provide additional heat to the reboiler and condenser except for the start-up stage, which reduces the use of heat exchange medium. The traditional heat pump distillation technology has certain requirements for the temperature difference between the tower top and the tower kettle. If the temperature difference between the tower top and the tower kettle is too large, the energy consumption of the compressor required for the tower top gas to be able to reboil the liquid phase of the tower kettle will be large, which is likely to cause the energy consumption of the heat pump distillation to be higher than that of the ordinary distillation. Since the gas phase at the tower top is in a saturated state, liquefaction is easy to occur when the compressor is adopted for direct compression, which not only easily affects the service life of the compressor, but also causes a large amount of high-quality energy to exchange heat with the air directly through the compressor, resulting in a large amount of energy loss. This module adds a heat exchanger on a top steam pipeline before a compressor, and draws out a stream of tower kettle discharge liquid as the heat exchange medium of this heat exchanger. The residual heat in the tower kettle discharge is adopted to heat the tower top steam, increase the temperature of the tower top steam, reduce the temperature difference between the tower top and the tower kettle, and make the tower top steam out of saturation.

The distillation intermediate heat exchange energy saving module mainly optimizes the internal of the distillation tower and system energy saving. Specifically, an intermediate reboiler and an intermediate condenser are added to the distillation tower to change a heat distribution of conventional distillation, and after the intermediate reboiler is added, a heating amount of the reboiler is distributed to the tower bottom and a stripping intermediate section. After the intermediate condenser is added, a heat load of the condenser is distributed to the tower top and the distillation intermediate section.

Specifically, in conventional distillation, the lowest temperature of the whole tower is at the tower top, and the heat exchange medium with lower temperature than the tower top is required to condense the top steam. The highest temperature of the whole tower is located at the tower kettle, and the heat exchange medium with higher temperature than the tower kettle is required to reboil the liquid phase in the tower kettle. The greater the momentum, heat and mass transfer impetus in the system, the greater the system energy loss. Therefore, if a large amount of high-grade heat exchange medium is required in the distillation process, it will cause a large amount of economic and material consumption. The disclosure provides a distillation energy saving technology by adding an intermediate reboiler and an intermediate condenser in the conventional distillation, which can save energy by adding the intermediate reboiler and the intermediate condenser in the distillation tower. The irreversibility of heat transfer inside the tower can be reduced to reduce the loss of work by altering the operation line of distillation operation through intermediate heat exchange and rational arrangement of the driving force for heat transfer process inside the tower, thus improving the thermodynamic efficiency of the process and achieving the purpose of energy saving.

Preferably, the energy saving and emission reduction system for chemical separation and purification process further includes: a distillation-continuous multistage countercurrent step crystallization united application module.

Through the distillation tower separation, the produced liquor is fed into the crystallizer, and the product precipitates in a crystal form from the crystallization segment, enters the molten segment after settling to the separation segment, and is produced after melting to a liquid state, and the remaining mixture residue is cycled back into the distillation tower feed after the crystallization separation in the crystallization segment. Due to constant phase change and countercurrent washing, a crystal bed with a very high density of crystal slurry exists within the separation segment, thus achieving separation of systems with close boiling points or isomers.

Further, for the systems with close boiling points or isomers, there are problems such as large reflux ratio and high energy consumption in the tower kettle when fully distillation process is adopted for separation of chemicals with high purity. Considering the high crystallization point difference of the system, the combination of distillation and crystallization is applied to achieve high purity separation of the systems with close boiling points or isomers, and at the same time, the problem of high energy consumption of distillation alone is avoided. Continuous multistage countercurrent step crystallization is carried out in a single equipment by making solid-liquid reverse flow contact to achieve separation and purification of the material, and gradually complete the separation process at multiple theoretical levels, and the type of the equipment is generally a tower type or a deformation of the tower type. Such equipment is characterized by the ability to achieve separation effects equivalent to several separation stages in a single equipment, high production capacity, and suitability for continuous production processes. This technique greatly reduced the energy consumption of the distillation process, and another product with 99.999% purity or even higher is obtained at the bottom of crystallization tower obtained, and the reflux ratio is reduced from the original 5 to 2-3 or even lower, which is suitable for the distillation of isomers or systems with similar boiling points, with low energy consumption and high purity of products.

The distillation-membrane separation combined application module separates and extracts a product through the distillation tower and feeds the product into a membrane separation device, and separates the product by different dissolution and diffusion rates of fluid components in polymer and different permeation rates through the membrane wall under an effect of differential pressures on both sides of the membrane.

Further, the material is first subjected to distillation separation, and the produced product is fed into the membrane separation device, where the separation is realized due to the different permeation rates of the fluid components through the membrane wall under the effect of differential pressures on both sides of the membrane because of the different dissolution and diffusion rates of the fluid components in the polymer. Compared with the traditional single distillation, it has high efficiency, low energy consumption, small pollution, and good product quality, which achieves very good economic and environmental benefits.

The yield of the distillation products of the energy saving and emission reduction system is up to 99.9999%, and the average yield is expanded to 40%.

According to the above technical scheme, compared with the prior art, the disclosure has at least the following technical effects.

1) The disclosure provides an energy saving and emission reduction system for chemical separation and purification process, which is suitable for the research and development of key technologies for energy saving and emission reduction in chemical separation and purification process under the background of carbon neutrality, and has achieved good environmental benefits. It has made outstanding contributions to comprehensive and rational utilization of energy, reduction of energy consumption, recovery of useful gases, afterheat, water resources and raw materials, reduction of waste water, waste gas and waste heat emissions in the production process, and thus reduction of greenhouse gas carbon dioxide emissions.

2) The technical scheme provided by the disclosure has achieved good social benefits, can greatly improve the production capacity of the distillation equipment, and effectively expand the production capacity and scale of the enterprise. At the same time, the application of new equipment and new technology has greatly improved the technical level, product quality and market competitiveness of chemical separation and purification in China.

3) The disclosure significantly reduces the comprehensive energy consumption and raw material consumption in the production process, improves the energy utilization rate, promotes the progress of industry science and technology, and makes positive contributions to improving the overall level of chemical production separation in China.

4) The technical scheme provided by the disclosure provides strong support for the factory to realize large-scale production. According to the statistics of application proof data of many enterprises, in the past three years, the total energy saving of the disclosure in the production process is 245,500 tons of standard coal, equivalent to the reduction of 7,120,000 tons of carbon dioxide emissions, equivalent to nearly 97,000 mu of afforestation every year, which has made an important contribution to the early realization of the national peak carbon dioxide emissions and carbon neutrality goals.

BRIEF DESCRIPTION OF THE DRAWINGS

In order to explain the embodiments of the present disclosure or the technical scheme in the prior art more clearly, the following drawings that need to be used in the description of the embodiments or the prior art are briefly introduced. Obviously, the drawings in the following description are only embodiments of the present disclosure. For those of ordinary skill in the art, other drawings can be obtained based on the drawings disclosed without creative work.

Figure 1:
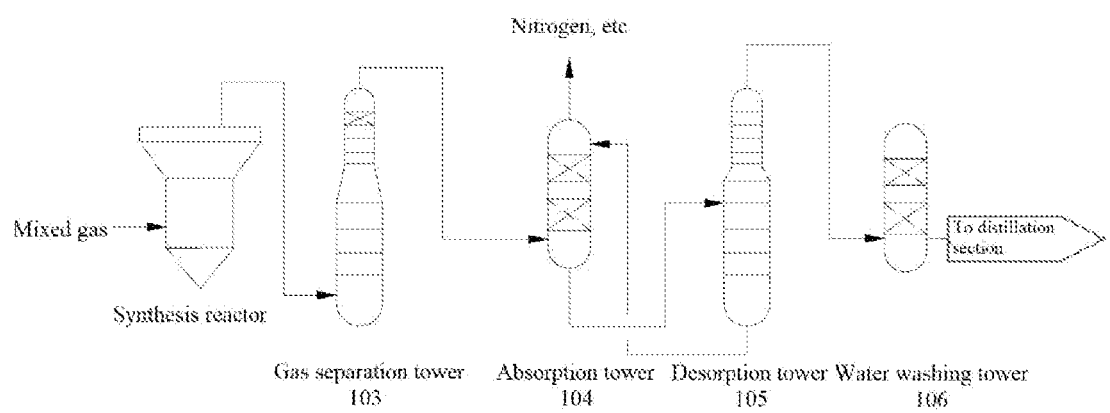
FIG. 1 shows the schematic diagram of the structure of the synthesis section in embodiment 2 of the present disclosure.
Figure 2:
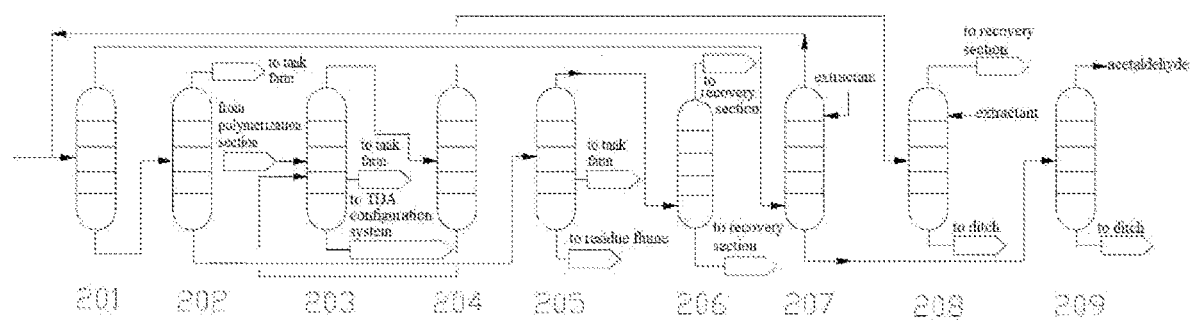
FIG. 2 shows the schematic diagram of the structure of the distillation section in embodiment 2 of the present disclosure.
Figure 3:
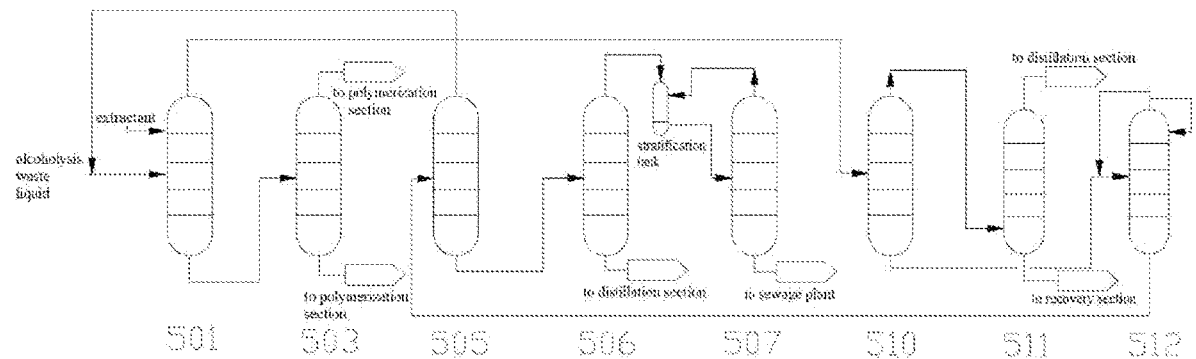
FIG. 3 shows the schematic diagram of the recovery section in embodiment 2 of the present disclosure.
Figure 4:
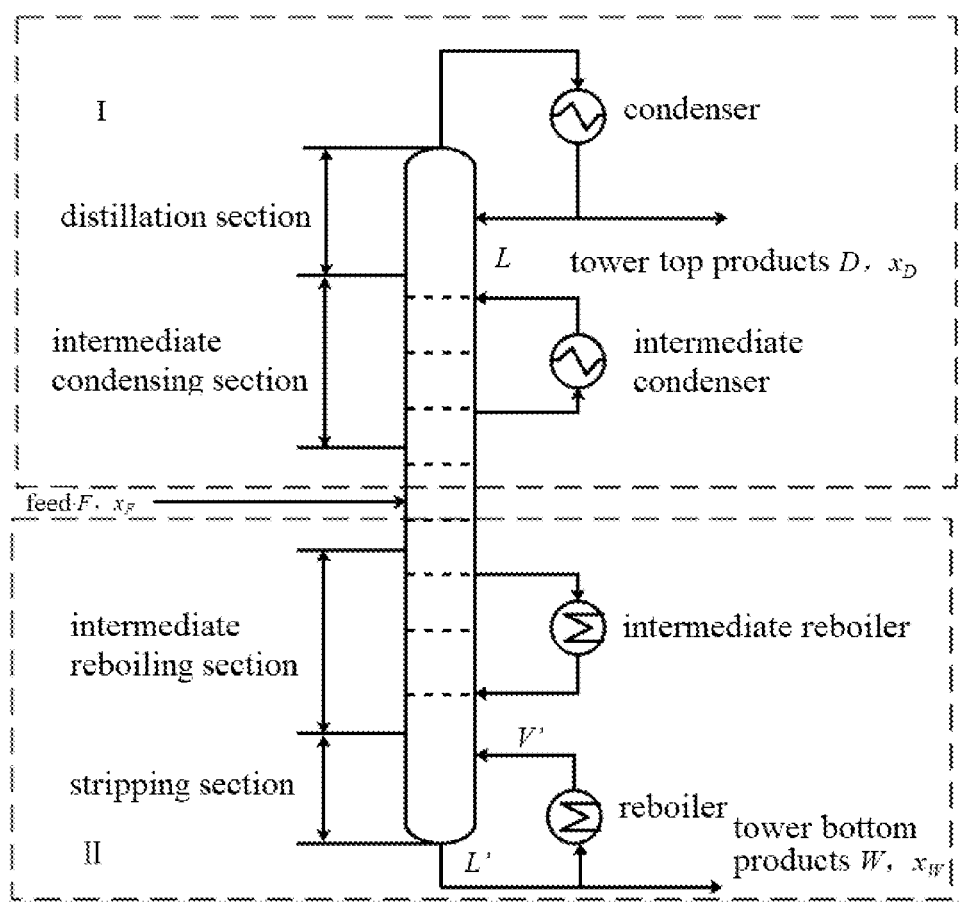
FIG. 4 shows the schematic diagram of the distillation operation process energy saving module in embodiment 3 of the present disclosure.
Figure 5:
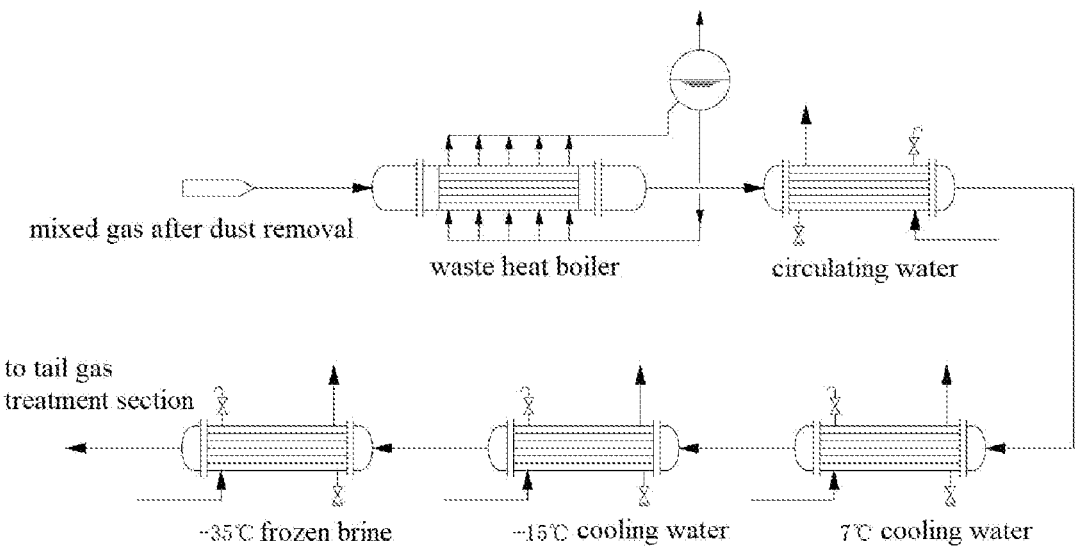
FIG. 5 shows the schematic diagram of the heat pump distillation energy saving module in embodiment 4 of the present disclosure.
Figure 6:
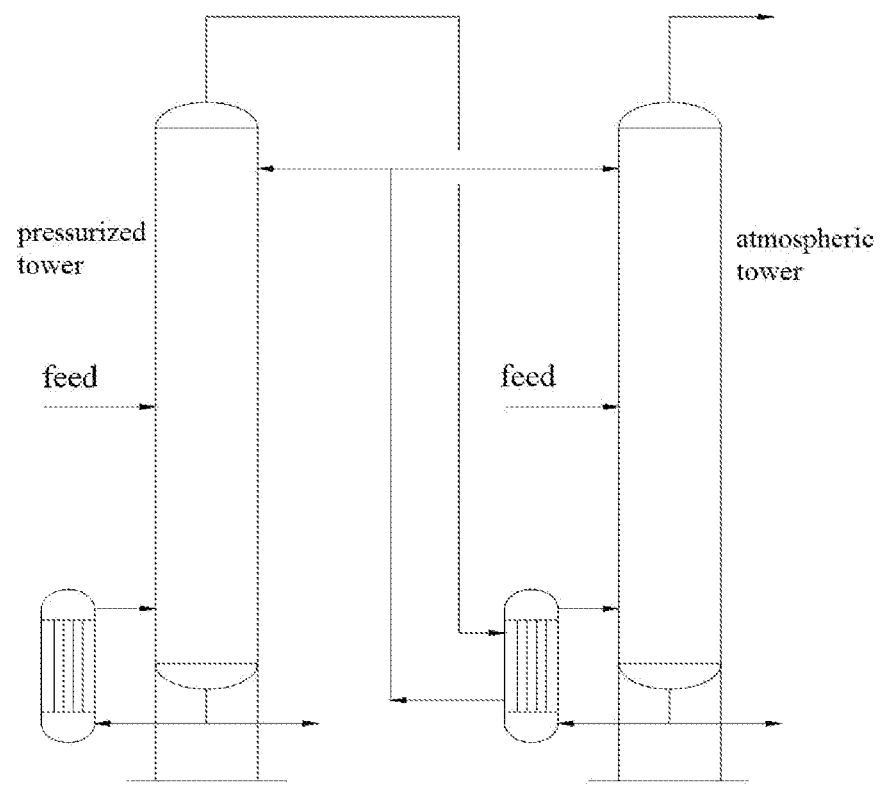
FIG. 6 shows the schematic diagram of the distillation system heat integration energy saving module in embodiment 6 of the present disclosure.
Figure 7:
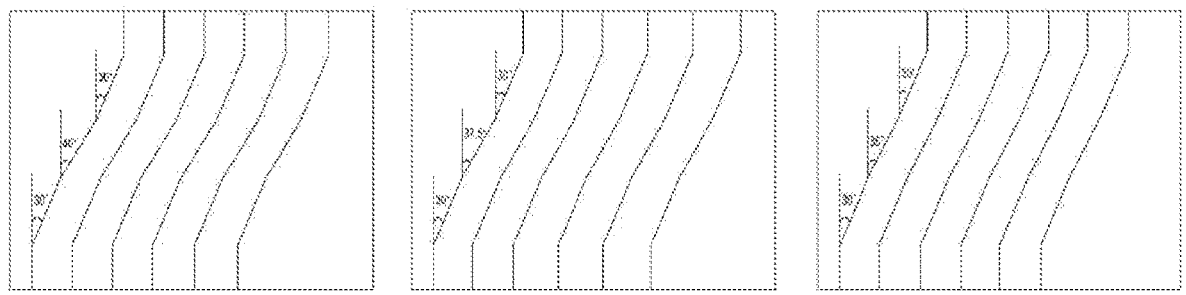
FIG. 7 shows the schematic diagram of the LPD packing distillation energy saving equipment module in embodiment 7 of the present disclosure.
Figure 8:
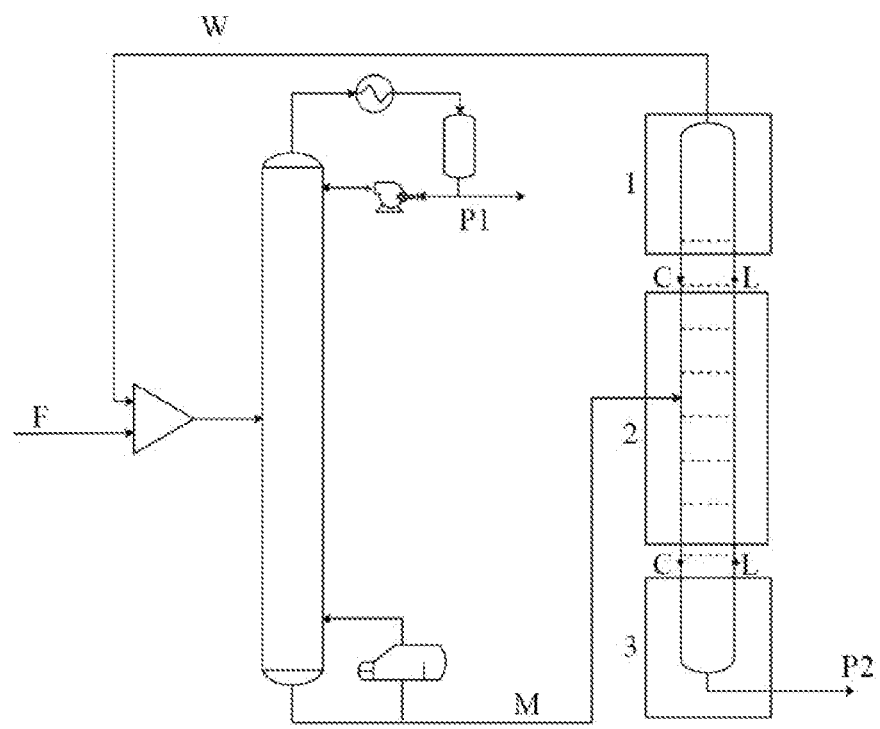
FIG. 8 shows the schematic diagram of the distillation-continuous multistage countercurrent step crystallization united application module in embodiment 11 of the present disclosure.

Wherein: 1 is the crystallization segment; 2 is the separation segment; 3 is the molten segment.

DETAILED DESCRIPTION OF THE EMBODIMENTS

Technical scheme of the present disclosure will be clearly and completely described below with reference to the embodiments. Obviously, the described embodiments are only part of the embodiments of the present disclosure, not all of them. Based on the embodiments of the disclosure, all other embodiments made by those skilled in the art without sparing any creative effort should fall within the protection scope of the disclosure.

Embodiment 1

The present embodiment provides an energy saving and emission reduction system for chemical separation and purification process. The chemical separation and purification process includes a synthesis section and/or a distillation section and/or a recovery section. The energy saving and emission reduction system includes an energy comprehensive utilization maximizing energy saving module.

Wherein, the energy comprehensive utilization maximizing energy saving module comprehensively evaluates the chemical separation and purification process, and acquires a lowest energy consumption value according to initial and final material flow parameters.

Then energy integration optimization and energy saving technical modification are performed on the synthesis section and/or distillation section and/or recovery section according to the lowest energy consumption value.

The energy saving technical modification of the synthesis section includes a heat pipe energy saving module and a multistage heat exchange energy saving module;

The energy saving technical modification of the distillation section includes a high-efficiency tray, a packing equipment energy saving module, an ionic liquid extractive distillation technology and gas-liquid phase equilibrium energy saving module, and a distillation operation process energy saving module.

The energy saving technical modification of the recovery section includes a high-efficiency tray packing equipment energy saving module, a distillation system heat integration energy saving module, a distillation operation process energy saving optimization module, and a distillation system automatic control and optimization module.

In order to further optimize the above technical scheme, the energy comprehensive utilization maximizing energy saving module is to design and construct an energy recovery maximizing network mathematical model, and to perform energy integration optimization on a complex energy distribution and a cold-hot material flow energy utilization rate in the distillation process.

Further, the energy comprehensive utilization maximizing energy saving module constructs a network that can not only meet the initial and final material flow temperatures, but also has the lowest utility consumption, which provides theoretical support for the energy saving optimization of the distillation process.

Based on the "MEU model", a multi-level and multi-dimensional system optimization scheme for distillation process is proposed, and an energy comprehensive utilization network is built to significantly reduce the energy consumption of distillation industry, and promote the high-quality, long-term, green and stable development of distillation industry. For large chemical processes, the distillation energy distribution is complex, and the cold-hot material flow energy utilization rate is low. The disclosure solves the problem that the current process optimization technology is difficult to fully cover all working conditions. Through the MEU network mathematical model, the limitations of the original process optimization method that is too simple and not comprehensive are broken, and a heat exchange network that can not only meet the heat exchange demand, but also minimize the number of utilities and heat exchangers is constructed.

In order to further optimize the above technical scheme, the heat pipe energy saving module is to add a heat pipe heat exchanger outside a pipe connecting a reactor and a gas separation tower, and the heat pipe heat exchanger is provided with convex teeth outside a gas pipe to increase a heat exchange area.

Or, an optimization is performed on a traditional direct heat pipe structure to obtain a heat pipe heat exchanger with a novel structure.

The heat pipe heat exchanger with a novel structure is an inverted U-shaped pipe, and an upper part of the inverted U-shaped pipe is a condensation section. A condensate flows along a wall of the inverted U-shaped pipe and flows to an evaporation section at a lower part of the inverted U-shaped pipe under the action of gravity, and the condensate absorbs heat in the evaporation section and evaporates into steam, and is then raised to the condensation section for re-condensation.

Further, the working substance in the evaporation section will boil or evaporate after being heated, absorb the heat of external heat source, generate latent heat of vaporization, and change from liquid to steam. The generated steam flows to the condensation section under the action of a certain pressure difference in the pipe, then meets the cold wall surface and external cold source, and condenses into a liquid. At the same time, it releases the latent heat of vaporization, and transmits it to the external cold source through the pipe wall. The condensate returns to the evaporation section by gravity (or wick) and evaporates again. In this way, heat transfer and exchange between the external cold and hot media can be realized. Due to its extremely high heat transfer coefficient, the heat pipe heat exchanger reduces the temperature difference between the cooling medium and the material, and improves the heat transfer efficiency. Typical heat pipe structure mainly includes shell, wick and working substance that can flow in the pipe. This module improves the structure of the heat pipe from the original straight pipe to the inverted U-shaped pipe. The upper part of the inverted U-shaped pipe is the condensation section, where the rising steam releases heat and condenses into condensate. The condensate flows along the inverted U-shaped pipe wall and under the action of gravity to the evaporation section at the lower part of the inverted U-shaped pipe. The condensate absorbs heat in the evaporation section and vaporizes into steam and rises to the condensation section for re-condensation, effectively expanding the heat exchange area, further reducing the quality of the heat exchange medium, and at the same time, it is more suitable for the heat exchange of minimal temperature difference heat pipes of industrial scale.

The multistage heat exchange energy saving module provides multiple grades of cold sources at the same time in the whole distillation system, and uses cold energy in a cascade way to reduce an exergy loss caused by heat exchange.

Further, chemical processes often produce fluids with very low temperature and high energy grade. If it is directly applied to fields that do not need such low temperature, it will inevitably cause a lot of exergy loss in the heat exchange process, which is unreasonable from the perspective of effective energy utilization. Therefore, cascade utilization of cold energy and reduction of exergy loss are very important. The refrigerant has grade. The lower the evaporation temperature, the higher the grade of the refrigerant and the greater the work loss. The greater the temperature difference between the cooled material and the refrigerant, the greater the work loss. The disclosure provides multiple grades of cold sources at the same time, reduces the exergy loss in the heat exchange process, and greatly reduces the operating costs and equipment costs. At the same time, through the comparison between the five-stage cascade condensation and the two-stage cascade condensation, the usage of the ultra-low temperature refrigerant is reduced by more than 70% by the five-stage cascade condensation.

In order to further optimize the above technical scheme, the high-efficiency tray and packing equipment energy saving module includes an FTP-type tray distillation energy saving module and an LPD packing distillation energy saving equipment module.

The FPT-type tray distillation energy saving module and the high-efficiency tray and packing equipment energy saving module are both verified by a mass transfer mechanism and a gas-liquid flow experiment on a tray, and a common tray is replaced or an FPT-type tray structure is optimized.

And, an FPT-type tray structure is formed by combining a guide hole, a trapezoidal cap cover and a packing.

Further, in order to overcome the problem that the pressure drop of ordinary tray packing is too high, resulting in the excessive temperature difference between the top and bottom of the tower, resulting in the waste of energy, a flow-guided trapezoid spray-packing tray (FPT) suitable for large flux is developed. The structural feature of the tray is that the opening area on the tray is provided with a guide hole with a slot direction consistent with the flow direction of the liquid phase, and the gas from the tower kettle is blown out horizontally from its trapezoidal slot through the guide hole, forming a parallel flow with the liquid advancing on the tray, which is conducive to the forward flow of the liquid and the reduction of the liquid level gradient, thus reducing the pressure drop.

In addition, the guide hole is opened in the arc-shaped area along the tangential direction of the tray arc, which effectively avoids the mass transfer dead zone and gas-liquid backmixing phenomenon that are easy to occur in this area. At the inlet of the liquid phase, a bubbling promoter with inclined upward bulge is installed. This structure is mainly used to reduce the liquid level gradient at both ends of the inlet and outlet of the liquid phase, so that the liquid phase can rapidly contact the gas phase blown out by the guide hole for mass transfer after entering the tray from top to bottom, which eliminates the non-activated zone at the upstream of the tray. In addition, rectangular holes with the same size are opened on the tray, and cap covers in the shape of trapezoid-rectangle are installed on the holes. The side wall of the cap cover is at a certain angle with the vertical direction, and the cross-sectional area is gradually reduced. After the liquid enters the cover from the bottom gap, it is lifted under the action of gas. The upper part of the cap cover is a semi-open structure, which solves the pressure suppression problem of the three-dimensional tray and reduces the pressure drop. Mellapak 250 structured packing is installed to increase the gas-liquid contact area and improve the mass transfer efficiency of the tray. The separation plate above the packing can intercept the liquid droplets to a certain extent and reduce the entrainment of mist.

The LPD packing distillation energy saving equipment module establishes a CFD multi-scale model and optimizes a gas-liquid phase flow in the packing to guide and improve the LPD packing structure.

The LPD packing structure is formed by vertically two segments of vertical straight line segments and corrugated plates of which a middle inclination angle changes continuously, and the changing middle inclination angle of the corrugated plates segments is divided into three types: A, B and C, in which the changes of the inclination angle of the corrugations are respectively: 30°–40°–30°, 30°–37.5°–30°, 30°–35°–30°, and a height of the straight line segments at the upper and lower ends is ⅛ of a height of a packing layer, the vertical height corresponding to each section of corrugation in the middle part is ⅔ of the packing height, and each broken line connection is connected with a smooth arc to reduce the dead zone of gas-liquid flow.

By changing the shape of the corrugations at the upper and lower ends of the packing, the gas-liquid flow condition between the two adjacent layers of packing can be effectively improved, and the gas-liquid flow resistance can be reduced. At the same time, the changing inclination angles of the corrugations enhance the turbulence of gas-liquid flow, promotes the renewal of the liquid film on the surface of the packing, strengthens the mass transfer process, effectively improves the flow condition between the two layers of packing, reduces the gas-liquid flow resistance, significantly reduces the pressure drop of the packing layer, lowers the tower kettle temperature, and realizes heat exchange energy conservation.

In order to further optimize the above technical scheme, the ionic liquid extractive distillation technology and gas-liquid phase equilibrium energy saving module includes an ionic liquid extractive distillation energy saving module and a gas-liquid phase equilibrium energy saving module.

Further, in chemical production, it is often encountered that the relative volatility between the separated components is close to 1 or the material system forms azeotrope, which can not be separated by ordinary distillation, and special distillation technology needs to be adopted. If the added new component cannot form an azeotrope with any component in the original material system, and its boiling point is higher than that of the original component, it leaves the distillation tower from the tower kettle, and this kind of special distillation is called extractive distillation. Therefore, selecting suitable extractant can make the separation process achieve twice the result with half the effort. Traditional extractive distillation uses organic solvent as extractant, which is large in amount and volatile, will pollute the environment, and the problem of high energy consumption is more and more obvious. The physical characteristics of the ionic liquid developed by this module just solve the above problems. A new ionic liquid is select as the extractant, the azeotropic point in the original material system is destroyed, and the purpose of separating azeotropes is achieved, which significantly reduce the energy consumption of azeotrope separation, and significantly reduce the equipment investment.

The ionic liquid extractive distillation energy saving module performs theoretical research and data analysis on the basis of an existing extractant, acquires an ionic liquid as a novel green extractant and verifies same, and at the same time, measures gas-liquid equilibrium data thereof.

The gas-liquid phase equilibrium energy saving module uses an azeotropic binary system gas-liquid phase equilibrium data as a basis, and adds an ionic liquid as a novel extractant to constitute ternary system VLE data. Specifically, the gas-liquid phase equilibrium energy saving module relates the binary and ternary gas-liquid phase equilibrium data by using Wilson, NRTL, UNIQUAC or UNIFAC models, acquires a feasibility data of an ionic liquid as a novel extractant, performs a process flow simulation, completes a process optimization, and determines an optimal distillation operating parameter.

Further, the gas-liquid phase equilibrium energy saving module mainly studies the VLE data of azeotropic binary system at atmospheric pressure (101.3 kPa), verifies the reliability of experimental instruments and equipment, and studies the VLE data of ternary system after adding ionic liquid. Three activity coefficient models, Wilson, NRTL and UNIQUAC, are adopted to correlate binary and ternary gas-liquid equilibrium data, explore the feasibility of separating binary azeotrope system by ionic liquid extractive distillation, and simulate the process flow. The process optimization is completed with the minimum total annual cost (TAC) as the objective function to determine the best operating parameters.

The ionic liquid extractive distillation technology and gas-liquid phase equilibrium energy saving module further includes a solid-liquid phase equilibrium module. The solid-liquid phase equilibrium module measures a solubility data of the investigated material system by experiment, and on this basis, performs a predictive calculation on the solubility data of the target material system and model correction, and improves a predictive effect of the model by using a classical thermodynamic mode.

Further, the solid-liquid phase equilibrium module selects the material system with practical significance and less research, fills in the blank of solid-liquid phase equilibrium of the studied system in multiphase solution by solubility data measured by experiment, and enriches the chemical database. A classical thermodynamic model is adopted to perform prediction calculation on solubility data of the target material system. By modifying the model, the prediction effect of the model is improved, so that the model is more practical and has a stronger prediction capability, thereby providing a theoretical foundation for industrial applications.

In order to further optimize the above technical scheme, the distillation operation process energy saving module and the distillation operation process energy saving optimization module are mainly an optimization of the internal and system energy saving innovation of a distillation tower. Specifically, a multi-level and multi-dimensional system optimization structure is first established on the basis of a single factor, and at the same time, the optimization of all factors in a distillation tower is completed, on the premise of guaranteeing the purity of a product, an operating point of minimum energy consumption is obtained.

Wherein, the single factor mainly includes: an optimal number of trays NT, an optimal feed position NF, an optimal feed quantity F, an optimal reflux ratio RR, an optimal operating pressure P and an optimal feed state.

In order to further optimize the above technical scheme, the distillation system heat integration energy saving module is an optimization of the internal and system energy saving of a distillation tower, that is, heat integration between a top condenser and a bottom reboiler, or heat integration between a condenser, a reboiler, and a heat source external to the system;

or heat integration between one distillation tower top condenser and another distillation tower intermediate reboiler.

Further, the distillation system heat integration energy saving module is one of the effective ways to fully utilize the energy in the system, and is an extremely effective energy saving technology. Compared with multi-effect distillation and thermally coupled distillation, which are more energy saving than ordinary distillation, the system heat integration distillation energy saving technology is more applicable to production systems such as ordinary heat exchange network system, distillation system, reaction system and utility system, and the energy saving effect is very significant. About the distillation system heat integration method, it can be the heat integration between a top condenser and a bottom reboiler, or the heat integration between a condenser, a reboiler, and a heat source external to the system, or heat integration between one distillation tower top condenser and another distillation tower intermediate reboiler, so as to save the circulating water, cooling water and water steam.

The distillation system automatic control and optimization module performs a dynamic control analysis on the distillation tower, compares dynamic disturbance conditions of different distillation tower control structures after disturbance occurs according to a feed quantity and feed composition, determines an optimal solution, and then establishes a distillation tower dynamic control mathematical model having a double-end control with a fast response speed and a small fluctuation, and at the same time, establishes a dynamic function compensation model for a liquid level at the bottom of the tower, and takes the feed quantity of the tower as a feed-forward signal.

The distillation tower dynamic control mathematical model has a two-terminal control method with fast response and small fluctuation. A dynamic function compensation model for the liquid level at the tower bottom is established, and the feed quantity of the tower is used as the feed-forward signal to enhance the robustness of the system. Aiming at the problems of poor control performance and large deviation of product purity in traditional single-terminal control or dual-temperature control, a component-temperature control structure that simultaneously interlocks product purity and temperature is proposed. The analyzer control can provide direct and correct product composition control, but it is expensive, complicated to maintain and large measurement lag. The temperature control has the problem of large fluctuation of product composition. The component-temperature control structure overcomes the disadvantages of analyzer control and temperature control. The component-temperature control structure transmits the product purity signal and temperature signal to the software for analysis at the same time to complete online correction. The component-temperature control structure has realized the advantages of fast response, high accuracy and small disturbance, which greatly reduces the "safe interval" of distillation, and can save 10%-13% energy on the original basis.

In order to further optimize the above technical scheme, the multistage heat exchange energy saving module further includes: a heat pump distillation energy saving module and a distillation intermediate heat exchange energy saving module.

The heat pump distillation energy saving module, which improves on a traditional heat pump distillation process, adds a heat exchanger on a top steam pipeline before a compressor, leads out a branch at a liquid outlet end of an discharge material from a tower kettle to serve as a heat exchange medium of the heat exchanger, and uses a residual heat in the discharge material from the tower kettle to heat the top steam. By exchanging heat between the discharge material of the tower kettle and the top material flow, a temperature of top steam is increased, a temperature difference between the tower top and the tower kettle is reduced, and at the same time, the top steam is separated from a saturated state to achieve energy saving.

Specifically, the technical core of the heat pump distillation energy saving module is the reverse Carnot cycle. After using the heat pump distillation technology, it is almost unnecessary to provide additional heat to the reboiler and condenser except for the start-up stage, which reduces the use of heat exchange medium. The traditional heat pump distillation technology has certain requirements for the temperature difference between the tower top and the tower kettle. If the temperature difference between the tower top and the tower kettle is too large, the energy consumption of the compressor required for the tower top gas to be able to reboil the liquid phase of the tower kettle will be large, which is likely to cause the energy consumption of the heat pump distillation to be higher than that of the ordinary distillation. Since the gas phase at the tower top is in a saturated state, liquefaction is easy to occur when the compressor is adopted for direct compression, which not only easily affects the service life of the compressor, but also causes a large amount of high-quality energy to exchange heat with the air directly through the compressor, resulting in a large amount of energy loss. This module adds a heat exchanger on a top steam pipeline before a compressor, and draws out a stream of tower kettle discharge liquid as the heat exchange medium of this heat exchanger. The residual heat in the tower kettle discharge is adopted to heat the tower top steam, increase the temperature of the tower top steam, reduce the temperature difference between the tower top and the tower kettle, and make the tower top steam out of saturation.

The distillation intermediate heat exchange energy saving module mainly optimizes the internal of the distillation tower and system energy saving. Specifically, an intermediate reboiler and an intermediate condenser are added to the distillation tower to change a heat distribution of conventional distillation, and after the intermediate reboiler is added, a heating amount of the reboiler is distributed to the tower bottom and a stripping intermediate section. After the intermediate condenser is added, a heat load of the condenser is distributed to the tower top and the distillation intermediate section.

Specifically, in conventional distillation, the lowest temperature of the whole tower is at the tower top, and the heat exchange medium with lower temperature than the tower top is required to condense the top steam. The highest temperature of the whole tower is located at the tower kettle, and the heat exchange medium with higher temperature than the tower kettle is required to reboil the liquid phase in the tower kettle. The greater the momentum, heat and mass transfer impetus in the system, the greater the system energy loss. Therefore, if a large amount of high-grade heat exchange medium is required in the distillation process, it will cause a large amount of economic and material consumption. The disclosure provides a distillation energy saving technology by adding an intermediate reboiler and an intermediate condenser in the conventional distillation, which can save energy by adding the intermediate reboiler and the intermediate condenser in the distillation tower. The irreversibility of heat transfer inside the tower can be reduced to reduce the loss of work by altering the operation line of distillation operation through intermediate heat exchange and rational arrangement of the driving force for heat transfer process inside the tower, thus improving the thermodynamic efficiency of the process and achieving the purpose of energy saving.

In order to further optimize the above technical scheme, the energy saving and emission reduction system for chemical separation and purification process further includes: a distillation-continuous multistage countercurrent step crystallization united application module.

Through the distillation tower separation, the produced liquor is fed into the crystallizer, and the product precipitates in a crystal form from the crystallization segment, enters the molten segment after settling to the separation segment, and is produced after melting to a liquid state, and the remaining mixture residue is cycled back into the distillation tower feed after the crystallization separation in the crystallization segment. Due to constant phase change and countercurrent washing, a crystal bed with a very high density of crystal slurry exists within the separation segment, thus achieving separation of systems with close boiling points or isomers.

Further, for the systems with close boiling points or isomers, there are problems such as large reflux ratio and high energy consumption in the tower kettle when fully distillation process is adopted for separation of chemicals with high purity. Considering the high crystallization point difference of the system, the combination of distillation and crystallization is applied to achieve high purity separation of the systems with close boiling points or isomers, and at the same time, the problem of high energy consumption of distillation alone is avoided. Continuous multistage countercurrent step crystallization is carried out in a single equipment by making solid-liquid reverse flow contact to achieve separation and purification of the material, and gradually complete the separation process at multiple theoretical levels, and the type of the equipment is generally a tower type or a deformation of the tower type. Such equipment is characterized by the ability to achieve separation effects equivalent to several separation stages in a single equipment, high production capacity, and suitability for continuous production processes. This technique greatly reduced the energy consumption of the distillation process, and another product with 99.999% purity or even higher is obtained at the bottom of crystallization tower obtained, and the reflux ratio is reduced from the original 5 to 2-3 or even lower, which is suitable for the distillation of isomers or systems with similar boiling points, with low energy consumption and high purity of products.

The distillation-membrane separation combined application module separates and extracts a product through the distillation tower and feeds the product into a membrane separation device, and separates the product by different dissolution and diffusion rates of fluid components in polymer and different permeation rates through the membrane wall under an effect of differential pressures on both sides of the membrane.

Further, the material is first subjected to distillation separation, and the produced product is fed into the membrane separation device, where the separation is realized due to the different permeation rates of the fluid components through the membrane wall under the effect of differential pressures on both sides of the membrane because of the different dissolution and diffusion rates of the fluid components in the polymer. Compared with the traditional single distillation, it has high efficiency, low energy consumption, small pollution, and good product quality, which achieves very good economic and environmental benefits.

Embodiment 2

The complete set of polyvinyl alcohol (PVA) production process in chemical production is a representative and typical process, which is long and complex. The complete PVA production process can be divided into the following sections: acetylene section, synthesis section, distillation section, polymerization section, alcoholysis section, and recovery section.

Wherein:

Acetylene section: The main purpose of this section is to prepare refined acetylene from crude acetylene. Generally, it includes two processes: pretreatment and washing.

Synthesis section: The main task of this section is to react the mixed gas of refined acetylene from the previous section and acetic acid under the catalysis of catalyst to generate vinyl acetate in the synthesis system, then generate the reaction liquid after separation and recovery separate, and send it to the distillation section.

Distillation section: This section is to separate and refine the synthetic reaction liquid and the feed liquid from other sections, and the refined vinyl acetate (VAC) obtained is supplied for the polymerization section. The recovered refined acetic acid (HAC) and non-condensable gas acetylene ($C_2H_2$) are returned to the synthesis section as raw materials, and other by-products, methyl acetate (MeOAc), acetaldehyde (Ald), etc., are recycled. The composition includes: vinyl acetate refining system, recovered vinyl acetate refining system, acetic acid refining system, methyl acetate recovery system and acetaldehyde recovery system.

Polymerization section: The purpose of this section is to polymerize the monomer refined vinyl acetate to obtain the intermediate product polyvinyl acetate (PVAC) for subsequent PVA production. The composition includes: preparation of initiator, polymerization of vinyl acetate, blowing-out distillation, extractive distillation, methanol distillation, and dealdehyde distillation.

Alcoholysis section: The main task of this section is to generate PVA by alcoholysis of PVAC from the previous section. The process includes mixing PVAC and alkali methanol, alcoholysis and crushing, then obtaining PVA products by filtering and drying the crushed crude polyvinyl alcohol and other subsequent operations, and then sending the PVA products to the packaging process for packaging.

Recovery section: This section is the alcoholysis waste liquid recovery unit of the production line. Its main task is to recover MeOH in the alcoholysis waste liquid, decompose MeOAc into MeOH and HAC, and recycle them after separation and refining.

Embodiment 1 of the disclosure is applied to the synthesis section, distillation section and recovery section of the process. The following is the specific implementation results of the energy saving technical transformation of the above three sections of the PVA production line of Shuangxin Company in Inner Mongolia.

Before implementing energy saving technical transformation for the overall process of the three sections, the comprehensive evaluation of the entire production process is carried out by the energy comprehensive utilization maximizing energy saving module. The purpose of this technology is to make the process have the lowest energy consumption while meeting the initial and final material flow parameters. On the basis of comprehensive evaluation, the key links with complex energy distribution and low utilization rate in the synthesis section, distillation section and recovery section are respectively subjected to the energy integration optimization, and the implementation of various key energy saving technologies is targeted, and the implementation of each energy saving technology ultimately serves the realization of the maximum comprehensive utilization of energy.

According to the energy comprehensive utilization maximizing energy saving module:

The main energy consumption of the synthesis section comes from the high temperature of the reactor and the high condensation load of the gas separation tower.

The main energy consumption of the distillation section comes from the low separation capacity of the traditional tray packing, the large amount of extractant used in extractive distillation and the unsatisfactory effect, and the large operating load of the tower caused by the main distillation process parameters not reaching the optimal value.

The main energy consumption of the recovery section comes from the low separation capacity of the traditional tray packing, the large operating load of the tower caused by the failure of the main distillation process parameters to reach the optimal value, the insufficient and ineffective use of the energy in the distillation system (tower 501/503/512), the low level of automation control of the traditional distillation system, and the slow response to the changes in materials and temperature of the multi-tower coordinated operation, resulting in energy waste.

Therefore, according to the evaluation results, targeted energy saving transformation is carried out for each section, as follows.

1) Synthesis Section:

The Process of Synthesis Section is as Follows:

a) The mixture of $C_2H_2$ and HAC enters the bottom of the reactor, and the reaction gas enters the gas separation tower 103 from the top of the reactor.

b) $C_2H_2$ from the top of 103 enters the bottom of the absorption tower 104 and is in countercurrent contact with the low-temperature absorption liquid. $C_2H_2$ is dissolved and absorbed, and the non-absorbed nitrogen is discharged from the top of the tower. The absorption liquid in the absorption tower kettle is sent to the desorption tower 105. The desorbed kettle liquid is returned to the top of tower 104. The desorbed $C_2H_2$ enters the water washing tower 106. $C_2H_2$ is subjected to low-temperature water washing to remove the entrained Ald and then sent to the distillation section.

Relevant Energy Saving Technical Transformation:

The main energy consumption of the synthesis section comes from the high temperature of the reactor and the high condensation load of the gas separation tower. For this purpose, heat pipe technology and multistage heat exchange technology are adopted to achieve the goal of maximizing energy synthesis and saving energy.

a) Heat pipe energy saving module: in the synthesis reactor, the mixed gas of $C_2H_2$ and HAC blows the zinc acetate-activated carbon catalyst to form a boiling state. Under the catalysis of the catalyst, $C_2H_2$ and HAC reacts to generate VAC and release reaction heat. The reaction temperature can be maintained at 178° C. Part of the reaction heat is taken away by jacket SK oil, part of the reaction heat is adopted to preheat the mixed gas to the reaction temperature in the reactor, and the rest of the reaction heat is taken out by the reaction gas. The high temperature (165~220° C.) syngas from the reactor enters the gas separation tower through the pipeline for condensation and separation, and the cooling capacity is supplied by electric refrigeration. In order to utilize the heat of syngas and reduce the heat load of the gas separation tower, a heat pipe heat exchanger is added outside the pipe connecting the reactor and the gas separation tower. The heat pipe heat exchanger is provided with convex teeth outside the gas pipe to increase a heat exchange area, so that the heat transfer is increased. The heat pipe heat exchanger has high heat exchange efficiency and full energy utilization.

b) Multistage heat exchange energy saving module: due to the high outlet temperature of the reactor during the production process, a large amount of refrigerant is required for ordinary condensation, resulting in serious waste of energy and materials. In this technical transformation, multistage cascade condensation process is adopted, and the residual heat of materials in other sections and lines is fully adopted for heat exchange treatment of reactor outlet materials, which reduces the use of low-temperature refrigerant and greatly reduces the energy consumption of low-temperature refrigerant production.

2) Distillation Section:

The Process of Distillation Section is as Follows:

a) Vinyl acetate refining system: the crude VAC from the synthesis section enters 201, and the condensate containing VAC, Ald and a small amount of $H_2O$ at the tower top is extracted as 207 feed. The recovery portion extracts Ald with extractant soft water or low-temperature acetaldehyde water in 207, and the tower top distillate is returned to 201, and the tower bottom extract is sent to the ninth distillation tower 209. The kettle liquid in 201 is sent to 202 to separate VAC and HAC. 202 tower top distillate condensate containing VAC, Ald, Cr-Ald and other extracted products are analyzed to be qualified and sent to the finished VAC tank in the tank farm. The kettle liquid in 202 is directly sent to the fifth distillation tower 205.

b) Recovery of vinyl acetate refining system: the crude VAC sent from the subsequent polymerization section and the kettle liquid of the fourth distillation tower 204 are used as the feed of the third distillation tower 203, and the finished VAC is extracted from the 203 side line and sent to the tank farm. The distillate from the tower top is produced and sent to the feed of 204. The kettle liquid in the tower bottom is sent to the polymerization inhibitor (also known as TDA configuration system to prevent self-polymerization in the distillation process) preparation system. 204 tower top extraction is fed into the eighth distillation tower 208.

c) Acetic acid refining system: the kettle liquid from 202 is directly sent to 205 for refining, and the finished HAC is extracted from the side line of 205 tower and then sent to the tank farm. The extraction from the tower top is fed into the sixth distillation tower 206. The kettle liquid in the tower bottom is acetic acid residue, which is sent to the residue flume. The extraction from 206 tower top is sent to the recovery section, and the kettle liquid is also sent to the recovery section.

d) Methyl acetate recovery system: distillate from 204 is sent to 208, 208 is as an extractive distillation tower, and water is added to the tower top to extract MeOAc. The tower top extraction is sent to the recovery section. The kettle liquid of the tower kettle is discharged into the ditch.

e) Acetaldehyde recovery system: the extraction liquid from 207 tower kettle is adopted as the feed of 209. Aid is separated and produced at 209 tower top, and the kettle liquid is discharged into the ditch.

Relevant Energy Saving Technical Transformation:

The main energy consumption of the distillation section comes from the low separation capacity of the traditional tray packing, the large amount of extractant used in extractive distillation and the unsatisfactory effect, and the large operating load of the tower caused by the main distillation process parameters not reaching the optimal value. For this purpose, the high-efficiency tray and packing equipment technology, ionic liquid extractive distillation technology, and the application of gas-liquid phase equilibrium module, as well as the optimization technology of distillation operation process are adopted to achieve the goal of maximizing energy integration and energy saving.

a) High-efficiency tray and packing equipment energy saving module: At present, tower 203 in the distillation section has not met the actual production demand. The production capacity of the tower is low due to the large operating load. At the same time, due to the problems of high material viscosity and large flow resistance on the tray in the feed of the polymerization section, it is easy to cause flooding or tower plugging. The present disclosure provides a technical transformation plan to replace the original ordinary tray with FPT tray. As the FPT tray has the functions of guiding, large flux and high separation efficiency, the gas-liquid flow in the tower has been greatly improved, and the start-up has been successful at the first time. After technical transformation, the operation of the tower has reached and exceeded the required indicators, especially the recovery rate of side-line VAC is as high as 99.855~99.9%, which not only greatly improves the recovery rate of VAC, but also effectively reduces the processing load and energy consumption of subsequent sections.

At the same time, on the one hand, the production capacity of the existing 204 tower is insufficient due to the increase of the production capacity of the 203 tower. On the other hand, the separation effect of 204 tower can not meet the requirements at present. The indicators of tower top distillate VAC are unstable and the content is high (>3%). Acetaldehyde and butyraldehyde are produced after being sent to the next tower, which ultimately affects the quality of methanol and PVA products. In view of this phenomenon, technical transformation is carried out. The internals of the distillation tower are replaced, and high-efficiency and high-flux LPD packing are adopted, which reduces the gas-liquid flow resistance inside the tower, strengthens the mass transfer process, significantly reduces the pressure drop of the whole tower. The production capacity is increased by 30% compared with the original tower, the requirement of VAC<1% at the tower top is met, and the production cycle is extended at the same time.

b) Ionic liquid extractive distillation technology and gas-liquid phase equilibrium energy saving module: At present, the recovery effect of MeOAc from 208 tower by extractive distillation is unsatisfactory, and some impurities remain in the system, affecting the product quality. In the technical transformation, ionic liquid extraction is adopted to replace the original water as the extractant. First, phase equilibrium data association is performed by the NRTL activity coefficient model on the separation system of 208 tower, the feasibility of ionic liquid extractive distillation separation is explored, and process simulation is conducted to determine the best operating parameters. On this basis, a new ionic liquid extractant is added at the tower top to change the relative volatility of the system and better recover MeOAc. 208 tower has been improved to achieve better results in practical industrial applications, which greatly reduces the amount of extractant added, achieves gas-liquid phase equilibrium of all materials in the tower, and greatly reduces the consumption of circulating water, electricity and other utilities.

c) Distillation operation process energy saving module: The PVA production project of the company originally used mature process packages, but the economic benefits are unsatisfactory. It is transformed by the present energy saving module. Through the Aspen simulation software and the calculation of the strict algorithm, the reflux ratio, theoretical tray number, etc. which are actually adopted by industry are substituted into the strict algorithm, and the parameter adjustment is performed. The optimal operating parameters for the full tower are obtained by sensitivity analysis of the top recovery, reflux ratio and feed position to the quality of key components in the top and bottom of the tower.

3) Recovery Section:

The Process of Recovery Section is as Follows:

a) The alcoholysis waste liquid from the previous section is mixed with the distillate of the fifth distillation tower 505 into the first distillation column 501 for extractive distillation. The extractant water is added from the tower top, steam of MeOAc with a content of about 92% is distilled from the top of the 501 tower, and a small amount of ALD is desalted by feeding into the tenth distillation tower 510. Low boiling point material distilled from the top of the 501 tower such as ALD is used as the feed for the eleventh tower 511. The main purpose of 511 is to separate two components of MeOAc and ALD, and the tower top distillate ALD is sent to the distillation section. The methanol aqueous solution with about 95% MeOH content in the 501 tower kettle is fed into the third distillation column 503 to realize MeOH refinement. The 503 tower top distillate MeOH is sent to the first distillation tower in the polymerization section, and the tower kettle liquid is high-temperature wastewater, which is sent to the third distillation tower in the polymerization section to recover heat.

b) The 510 kettle liquid is adopted as the feed of the decomposition reaction distillation towe 512 to carry out the hydrolysis pre reaction of MeOAc. The 512 kettle decomposed liquid is returned to 505 as feed. Part of the MeOAc of the tower top is refluxed, and part is returned to the inside of the decomposition reaction tower. The azeotrope of MeOAc and MeOH is distilled from the top of the 505 tower, HAC is controlled to be less than 0.03%, and is fed to 501 as feed. The tower kettle liquid is HAC aqueous solution, and methanol is controlled to be less than 0.05%, which is as the feed of the sixth distillation tower 506.

c) HAC is subjected to azeotropic distillation for concentration at 506 tower. The tower top is steam of azeotrope formed from isopropyl acetate with water, and the acetic acid concentration is controlled to be less than 0.03%. Distillate from the tower top is sent into the stratification tank, the upper solvent is isopropyl acetate, the lower layer is separation water containing a small amount of isopropyl acetate, which is fed into the seventh distillation tower 507 for distillation. The interface of the stratification tank of 506 is controlled here by adjusting the separation water output. The kettle liquid of 506 is returned to the distillation section for treatment. The tower top distillate of 507 tower is an azeotrope of ipa and water, which is returned to the stratification tank of 506 for regular and quantitative waste rejection, and send the kettle liquid wastewater is sent to the sewage plant for treatment.

Relevant Energy Saving Technical Transformation:

The main energy consumption of the recovery section comes from the low separation capacity of the traditional tray packing, the large operating load of the tower caused by the failure of the main distillation process parameters to reach the optimal value, the insufficient and ineffective use of the energy in the distillation system (tower 501/503/512), the low level of automation control of the traditional distillation system, and the slow response to the changes in materials and temperature of the multi-tower coordinated operation, resulting in energy waste. For this purpose, the high-efficiency tray packing equipment technology, the distillation system heat integration energy saving technology, the distillation operation process energy saving optimization technology, and the distillation system automatic control and optimization are adopted to achieve the goal of maximizing energy integration and energy saving.

a) FPT-type tray distillation energy saving module: At present, the feed quantity of 501 tower at full load is about 44 m³/h, which can not meet the production capacity of PVA. Through transformation, the production capacity of 501 tower is improved. In view of this goal, the proposed transformation scheme is proposed for the 501 tower, and the original tray is replaced with FPT-type tray. Since the FPT-type tray has the functions of guiding, large flux and high separation efficiency, the gas-liquid phase flow in the tower has been greatly improved. After the technical transformation, the operation of the tower has reached the required production capacity, and the upper limit of feeding capacity can reach 55 m³/h.

b) Distillation system heat integration energy saving module: The purpose of 503 tower is to realize MeOH refining, and the pressure distillation method is adopted for its technical transformation. MeOH gas from tower top is sent to reboiler of 501 tower and reboiler of 512 tower as heat source, and the condensate is sent to condenser of 503 tower for cooling after heat exchange. The distillate is partially refluxed and partially sent to the tank farm. Energy saving transformation combines the top condenser of the pressurized tower with the bottom reboiler of the atmospheric tower, thus saving the circulating water, cooling water and water steam, and realizing the energy recovery and utilization between multiple towers. After technical transformation, the tower top is 99.5% MeOH, which not only improves the product purity, but also fully achieves the purpose of energy saving and consumption reduction.

c) Distillation operation process energy saving optimization module: Through the Aspen simulation software and the calculation of the strict algorithm, the reflux ratio, theoretical tray number, etc. which are actually adopted by the recovery section are substituted into the strict algorithm, and the parameter adjustment is performed. The optimal operating parameters for the full tower are obtained by sensitivity analysis of the top recovery, reflux ratio and feed position to the quality of key components in the top and bottom of the tower.

d) Distillation system automatic control and optimization module: Due to the complexity of PVA production process, the recovery section requires the collaborative operation of multiple distillation towers, which has high requirements for the control system. The automatic control level of the original distillation system is low, and the reaction to the change of material and temperature is slow, which often leads to the product purity not reaching the standard, so that it is shut down for repair. The distillation system automatic control and optimization module developed in embodiment 1 is adopted for transformation. The dynamic control analysis is applied to the distillation tower, the disturbances of feed quantity and feed composition are added, the dynamic disturbances corresponding conditions of different distillation tower control structures are compared, and the optimal control scheme is determined, so that the reflux ratio is accurately controlled at the minimum value of the "safe interval", and the energy consumption is reduced by 13% compared with that before the technical transformation.

The above energy saving technical transformation has been carried out on the corresponding links of the synthesis section, distillation section and recovery section of the PVA production line, and good economic results have been achieved. The amount of steam used in the whole production line decreased from 25 tons of steam per ton of PVA to 15 tons of steam per ton of PVA, and the amount of utilities (including circulating water and electricity consumption) decreased significantly. At the same time, the product quality and purity have been greatly improved, and the overall output of PVA has increased by 40% due to the improvement of the tower production capacity after the technical transformation. The material content in the discharged residual liquid is significantly reduced, and the reflux ratio is also lower than the original, with significant emission reduction effect. Since the project was put into operation, it has been producing steadily and continuously, not only improving economic benefits, but also achieving energy conservation and environmental protection benefits.

In the whole process, based on the evaluation of the total energy comprehensive utilization maximizing, energy integration optimization is carried out for the key links with complex energy distribution and low utilization rate in the synthesis process, distillation process and recovery process, and various key energy saving technology transformation is targeted and implemented. Finally, the implementation of each energy saving technology jointly achieves the sole purpose of energy comprehensive utilization maximizing.

Embodiment 3

Distillation Operation Process Energy Saving Module

The technology of the PVA production project of Inner Mongolia Mengwei Technology Co., Ltd. adopts the mature process package from Japan, but the economic benefits are not ideal. Embodiment 1 is adopted for modification. Through Aspen simulation software and strict method calculation, the reflux ratio 2.2 and theoretical tray number 25 actually used in industry are substituted into the strict algorithm, and the parameters are adjusted. The optimal operating parameters for the full tower are obtained by sensitivity analysis of the top recovery, reflux ratio and feed position to the quality of key components in the top and bottom of the tower. After the technical transformation, the methanol reflux ratio at the top of TQ-304 tower is reduced from 2.2 to 1.8. Based on 8000 hours per year, saving 50000 tons of water steam every year, and 100 yuan per ton of water steam, the energy benefit saved every year is 5 million yuan, while the investment is only about 600,000 yuan.

Embodiment 4

Heat Pump Distillation Energy Saving Module:

Polycrystalline silicon is an important intermediate product in the silicon industry chain and the most important and basic functional material in the semiconductor industry, electronic information industry and solar photovoltaic cell industry. The production of solar polycrystalline silicon often requires multiple towers in series and large return flow, and the energy consumption of distillation process is very high. Heat pump distillation can effectively use the heat of the system itself and reduce the demand for external energy.

The heat pump distillation energy saving module disclosed in embodiment 1 is used to reform the trichlorosilane production plant of Jiangsu Zhongneng. The temperature of trichlorosilane gas at the top of the tower rises after being pressurized by the compressor, and enters the reboiler to heat the kettle liquid, so that the kettle liquid is completely vaporized. After the trichlorosilane condensate is depressurized by the pressure reducing valve, a part of the liquid vaporizes and enters the reflux tank after being condensed by the auxiliary condenser. Some of the liquid returns, and the rest is extracted and enters the product tank.

TABLE 1

| Atmospheric distillation conditions of trichlorosilane tower | |
|---|---|
| Main parameters | Trichlorosilane tower |
| Number of trays/piece | 55 |
| Feeding tray position/piece | 24 |
| Return flow/(kg/h) | 13455 |
| Feed quantity/(kg/h) | 5495 |
| Top recovery/(kg/h) | 4642 |
| Operating pressure/MPa (g) | 0 |

Due to the use of heat pump distillation, the temperature at the top of the distillation tower is no longer limited by the refrigerant temperature. The trichlorosilane can be operated under atmospheric pressure, and the kettle temperature is reduced accordingly. The relative volatility of trichlorosilane and tetrachlorosilane increase, and the separation effect of trichlorosilane is further improved. Compared with conventional distillation, the reboiler in the heat pump distillation process does not need additional steam, which can save about 70% of the energy, reduce the utility cost of 5,007,200 yuan/year, and reduce the operating cost by 35.59%.

Embodiment 5

Henan Shangyu Company is one of the largest trichlorosilane manufacturers in China. In the production process, the outlet temperature of the reactor is about 300° C., and it needs to be condensed to −35~−55° C. with refrigerant. The use of two kinds of refrigerants to condense results in a large amount of energy and material waste. The new energy-saving technology combining the multistage heat exchange energy saving module and MEU heat exchange network in embodiment 1 is adopted, which fully uses the afterheat of the materials in each line to perform heat exchange on the materials at the reactor outlet, reducing the use of ultra-low temperature refrigerant by more than 70%, and greatly reducing the energy consumption of ultra-low temperature refrigerant production. Compared with the original German Siemens two-stage condensation process, it can save 16.1 million kilowatt-hours of electricity and about 9.66 million yuan of cost each year.

Embodiment 6

Distillation System Heat Integration Energy Saving Module:

Methanol is an important organic chemical raw material and new energy fuel, which has a wide range of applications in the fields of chemical industry, light industry and clean energy. In the process of methanol industrial production, the refining of crude methanol is an important process to determine the quality of methanol, and the energy consumption of refining process is also one of the key factors affecting the production cost of methanol.

Shanxi Sanwei Group 100,000 tons/year crude methanol refining process is taken as the example. The original process of the plant is mainly composed of pre-tower and atmospheric tower. The distillation system heat integration energy saving module is adopted for technical transformation. The operating pressure of the pressurized tower is 0.64 MPa (absolute pressure), and the top of the pressurized tower is methanol steam with a mass fraction of more than 99.95%, and the temperature is about 120° C. Therefore, the top methanol steam can be used as the heat source of the atmospheric tower reboiler, and the residual heat is adopted to preheat the crude methanol feed. The methanol condensed to 40° C. enters the reflux channel, one part of which is sent out as methanol product, and the other part is used as reflux liquid. The methanol aqueous solution discharged from the bottom of the pressurized tower is sent to the atmospheric tower. The fusel oil outlet is set at the middle and lower part of the atmospheric tower to ensure that impurities with boiling point lower than water are separated from the tower. 99.95% crude methanol is extracted from the top of the atmospheric tower, and the bottom wastewater is sent to the wastewater treatment system.

The distillation system heat integration energy saving module is to combine the top condenser of the pressurized tower and the bottom reboiler of the atmospheric tower, and use the top steam of the pressurized tower to heat the atmospheric tower reboiler, thus saving the circulating water cooling water and water steam. The three-tower dual-effect distillation process can improve the purity of refined methanol from 99.0% to more than 99.95%, reduce the heat load by 47.2%, and reduce the cooling load by 44.9%. 658.82 t/a of methanol can be recovered from the wastewater, which saves 26,833,300 kilowatt-hours of electricity. It fully achieves the function of energy saving and consumption reduction.

Embodiment 7

LPD Packing Distillation Energy Saving Equipment Module:

The industrial transformation is performed on the 180,000 t/a phenol-acetone section of Beijing Yanshan Branch of Sinopec. The content of emissions at the bottom of the original cumene distillation tower is as high as 0.5%, causing great waste and environmental pollution. The newly-built distillation tower adopts a new type of high-efficiency and high-flux LPD packing with a height of 10 m. The purity of the product cumene is increased from 99.0% to 99.9%, and the production capacity is increased by 30% compared with the original tower. Only in 2019, 83,700 tons of steam consumption and 2,511,000 tons of circulating water consumption were saved, with a total savings of 22.884 million yuan. At the same time, the amount of solvent is reduced, the production cycle is extended, and the shutdown cleaning cycle is extended from 3 to 6 months to more than one year.

Embodiment 8

FPT-Type Tray Distillation Energy Saving Module:

In the PVA production process, the polymerization section mainly carries out the separation of polyvinyl acetate (PVAC) and its mixture. Vinyl acetate (VAC) reacts in the polymerizer to generate polyvinyl acetate, and the polymer is separated from the unpolymerized monomer in the first distillation tower (first polymerization tower) of the polymerization section. The polymer is sent to the next section for further refining and recycling of the vinyl acetate. The content of polyvinyl acetate in the reaction liquid from the polymerization kettle is very high, and the viscosity of the material is high (6000~50000 cP, while the viscosity of the general organic liquid is only a few centipoises), which brings certain difficulties to the demeonomer distillation of the first polymerization tower. The tower originally used a bubble cap tray. The material flow resistance on the tray was large, resulting in flooding, tower plugging and other production accidents, with an average of 1-2 times per month. In serious cases, implosion or even explosion occurs in the polymerization kettle of the preceding sequence.

Xinjiang Tianneng adopts the FPT-type tray distillation energy saving module to carry out technical transformation on the first polymerization tower. As the FPT-type tray has the functions of guiding, large flux and high separation efficiency, the gas-liquid flow in the tower has been greatly improved, and the start-up has been successful at the first time. After the technical transformation, the operation of the tower reached and exceeded the required indicators, especially the VAC content in the tower kettle was reduced from 0.26% of the raw material to 0.02%~0.03%, which was much lower than the required value, making the VAC blowing rate as high as 99.855~99.9%. This not only greatly improves the recovery rate of VAC, but also effectively avoids the problem that the content of vinyl acetate exceeds the standard, resulting in the yellowing, brittleness and unqualified quality of polyvinyl alcohol. The VAC content at the tower top is increased from 50% to 60%, which reduces the processing load and energy consumption of the subsequent sections.

Under the premise of completing the separation task, the reflux ratio of the first polymerization tower of FTP was reduced from 1.3 to 0.7, which is reduced by 45% and energy saving by 36% due to the high efficiency of the tray. In 2019, there were 97,200 tons of steam consumption, 2.916 million tons of circulating water consumption and 20.7 million kilowatt-hours of electricity saved. It not only reduces the cost, but also saves a lot of energy consumption.

Embodiment 9

Heat Pipe Energy Saving Module:

The low temperature afterheat in the chemical process is characterized by a large amount, so it is of great significance to fully recover and utilize it. The common heat exchanger has small heat transfer temperature difference, high equipment investment, difficult maintenance and high operating costs, which makes it very difficult to recover chemical afterheat. The heat pipe heat exchanger has a very good application prospect in chemical afterheat recovery due to its independent heat exchange pipes, simple structure, low maintenance cost and high heat transfer efficiency.

In the process of vinyl acetate production of Shandong Tengzhou Chenlong Group Co., Ltd., the high-temperature (165~220° C.) syngas from the synthetic furnace enters the gas separation tower through the pipeline for condensation and separation, and the cooling capacity is supplied by electric refrigeration. In order to utilize the heat of syngas and reduce the heat load of gas separation tower, a heat pipe heat exchanger is added outside the pipe connecting the synthetic furnace and gas separation tower. The heat pipe heat exchanger increases the heat exchange area and heat transfer by adding convex teeth outside the gas pipe. The heat pipe heat exchanger has high heat exchange efficiency and full energy utilization. It saves 12 million kilowatt-hours of electricity annually, which is equivalent to 7.2 million yuan at 0.6 yuan/kilowatt-hour.

Embodiment 10

Distillation System Automatic Control and Optimization Module:

Dezhou Tianyu Chemical Co., Ltd. is a company with large production and high quality of propargyl alcohol in China. The purity of propargyl alcohol products needs to be compared with the famous foreign manufacturer BASF, Germany. The purity index of propargyl alcohol is 99.0%, but the process is complex and requires multiple distillation towers to operate together, which has high requirements for the control system. However, the distillation system of Tianyu has a low level of automation control and slow response to changes in materials and temperature, which often leads to the product purity not reaching the standard, so that it is shut down for repair. Moreover, the reflux ratio of single distillation tower is large, the energy consumption is high, and the product price competition is not dominant. The distillation system automatic control and optimization module developed in embodiment 1 is adopted for transformation. The dynamic control analysis is applied to the distillation tower, the disturbances of feed quantity and feed composition are added, the dynamic disturbance corresponding conditions of different distillation tower control structures are compared, and the optimal control scheme is determined, so that the reflux ratio is accurately controlled at the minimum value of the "safe interval". The reflux ratio is reduced from 2.5 to 2.2, and the energy consumption is 13% lower than that before the technical transformation.

Embodiment 11

Distillation-Continuous Multistage Countercurrent Step Crystallization United Application Module:

In the extraction, separation and purification of refined naphthalene in Anshan coal coking, the distillation-continuous multistage countercurrent step crystallization united application module significantly reduces the energy consumption, reduces the reflux ratio from 5 to 2, and reduces the energy consumption by 80~90%, with remarkable energy saving effect. For the distillation of isomers or systems with similar boiling points, high purity light component products can be obtained from the tower top by this technology. The kettle liquid in the tower bottom enters the crystallization tower. After continuous multistage countercurrent step crystallization, another product with purity of 99.999% or higher is obtained at the bottom of the crystallization tower, and the mixture obtained at the tower top continues to be rectified. In this way, the reflux ratio can be reduced to 2-3, and the energy consumption is extremely low, and the product purity is high.

Embodiment 12

Ionic Liquid Extractive Distillation Energy Saving Module:

The second distillation tower in the polymerization section of the polyvinyl alcohol (PVA) production process, referred to as the second polymerization tower, is TQ-302 (hereinafter referred to as TQ-302 tower). Its purpose is to separate vinyl acetate from methanol in the raw material (from the distillate of the first distillation tower in the polymerization section). Because vinyl acetate and methanol form an azeotropic system under atmospheric pressure, it is difficult to separate them by ordinary distillation. The ionic liquid extractive distillation energy saving module is adopted for the industrial transformation of the second polymerization tower in Ningxia Dadi with extractive distillation and the FPT-type tray distillation energy saving module. A new type of extractant is added at the top of the tower to change the relative volatility of vinyl acetate to methanol and destroy its azeotropic composition, so as to achieve the purpose of separating the azeotropic system of vinyl acetate and methanol. TQ-302 tower has been improved and achieved better results in practical industrial application. The increase of methanol content in tower kettle liquid has greatly reduced the amount of extractant added, which has decreased by 29,294 t/a. After the extractant is added to TQ-302, the reboiler is heated by water steam in the tower kettle, and all materials reach gas-liquid phase equilibrium in the tower. In 2019, a total of 64,800 tons of steam, 1,944,000 tons of circulating water and 13.8 million kilowatt-hours of electricity were saved.

The above description of the disclosed embodiments enables the skilled in the art to achieve or use the disclosure. Multiple modifications to these embodiments will be apparent to those skilled in the art, and the general principles defined herein may be achieved in other embodiments without departing from the spirit or scope of the disclosure. The present disclosure will therefore not be restricted to these embodiments shown herein, but rather to comply with the broadest scope consistent with the principles and novel features disclosed herein.

What is claimed is:

1. An energy saving and emission reduction system for chemical separation and purification process, wherein the chemical separation and purification process comprises a synthesis section and/or a distillation section and/or a recovery section; the energy saving and emission reduction system comprises an energy utilization maximizing energy saving module;

wherein, the energy utilization maximizing energy saving module evaluates the chemical separation and purification process, and acquires a lowest energy consumption value according to initial and final material flow parameters; then energy integration optimization and energy saving technical modification are performed on the synthesis section and/or distillation section and/or recovery section according to the lowest energy consumption value; the energy utilization maximizing energy saving module is to design and construct an energy recovery maximizing network mathematical model, and to perform energy integration optimization on a energy distribution in the distillation process;

the energy saving technical modification of the synthesis section comprises a heat pipe energy saving module and a multistage heat exchange energy saving module; the heat pipe energy saving module is to add a heat pipe heat exchanger outside a pipe connecting a reactor and a gas separation tower, and the heat pipe heat exchanger is provided with convex teeth outside a gas pipe to increase a heat exchange area; or, an optimization is performed on a traditional direct heat pipe structure to obtain a heat pipe heat exchanger with a structure; the multistage heat exchange energy saving module provides a plurality of grades of cold sources at the same time in the whole distillation system, and uses cold energy in a cascade way to reduce an energy loss caused by heat exchange; the multistage heat exchange energy saving module further comprises: a heat pump distillation energy saving module and a distillation intermediate heat exchange energy saving module;

the energy saving technical modification of the distillation section comprises a tray packing equipment energy saving module, an ionic liquid extractive distillation technology and gas-liquid phase equilibrium energy saving module, and a distillation operation process energy saving module; the ionic liquid extractive distillation technology and gas-liquid phase equilibrium energy saving module comprises: an ionic liquid extractive distillation energy saving module and a gas-liquid phase equilibrium energy saving module: the ionic liquid extractive distillation technology and gas-liquid phase equilibrium energy saving module further comprises a solid-liquid phase equilibrium module, wherein the solid-liquid phase equilibrium module measures a solubility data of the investigated system by experiment, and on this basis, performs a predictive calculation on the solubility data of the target system and model correction, and improves a predictive effect of the model by using a classical thermodynamic mode;

the energy saving technical modification of the recovery section comprises the tray packing equipment energy saving module, a distillation system heat integration energy saving module, a distillation operation process energy saving optimization module, and a distillation system automatic control and optimization module the distillation operation process energy saving module and the distillation operation process energy saving optimization module are an optimization of the internal and system energy saving innovation of a distillation tower the distillation system automatic control and optimization module performs a dynamic control analysis on the distillation tower, and then establishes a distillation tower dynamic control mathematical model having a double-end control with a fast response speed and a small fluctuation; at the same time, establishes a dynamic function compensation model for a liquid level at the bottom of the tower, and takes the feed quantity of the tower as a feed-forward signal;

wherein the tray packing equipment energy saving module comprises an packing distillation energy saving equipment module;

the packing distillation energy saving equipment module establishes a multi-scale model, optimizes a gas-liquid phase flow in the packing, and improves an packing structure;

the packing structure comprises two vertical straight line segments and a middle polyline segment; the middle polyline segment comprises corrugated plates having continuously changing middle inclination angle, the continuously changing middle inclination angle is divided into three types: A, B and C, in which the changes of the inclination angle relative to the vertical straight line segment are respectively: 30°–40°–30°, 30°–37.5°–30°, 30°–35°–30°, and a height of the vertical straight line segments at upper and lower ends is ⅛ of a height of a packing laver, and connection parts of corrugated plates are connected by smooth arcs.

2. The energy saving and emission reduction system for chemical separation and purification process of claim 1, wherein
   the ionic liquid extractive distillation energy saving module performs data analysis on the basis of an existing extractant, acquires an ionic liquid as a green extractant, and at the same time, measures gas-liquid equilibrium data thereof;
   the gas-liquid phase equilibrium energy saving module acquires a feasibility data of an ionic liquid as a extractant, performs a process flow simulation, completes a process optimization, and determines an optimal distillation operation parameter.

3. The energy saving and emission reduction system for chemical separation and purification process of claim 1, wherein a multi-level and multi-dimensional system optimization structure is first established on the basis of each of a plurality of factors, and at the same time, the optimization of all of the plurality of factors in a distillation tower is completed, an operating point of minimum energy consumption is obtained;
   wherein, the plurality of factors comprise: an optimal number of trays NT, an optimal feed position NF, an optimal feed quantity F, an optimal reflux ratio RR, an optimal operating pressure P.

4. The energy saving and emission reduction system for chemical separation and purification process of claim 1, wherein the distillation system heat integration energy saving module is an optimization of the internal and system energy saving of a distillation tower;
   or heat integration between a condenser, a reboiler, and a heat source external to the system;
   or heat integration between one distillation tower top condenser and another distillation tower intermediate reboiler.

5. The energy saving and emission reduction system for chemical separation and purification process of claim 1, wherein
   the heat pump distillation energy saving module, improving on a heat pump distillation process, adds a heat exchanger on a top steam pipeline before a compressor, leads out a branch at an liquid outlet end of an discharge material from a tower kettle to serve as a heat exchange medium of the heat exchanger, and uses a residual heat in the discharge material from the tower kettle to heat the top steam; by exchanging heat between the discharge material of the tower kettle and the top material flow, a temperature of top steam is increased, a temperature difference between the tower top and the tower kettle is reduced, and at the same time, the top steam is separated from a saturated state to achieve energy saving,
   the distillation intermediate heat exchange energy saving module optimizes the internal of the distillation tower and system energy saving, an intermediate reboiler and an intermediate condenser are added to the distillation tower to change a heat distribution of conventional distillation, and after the intermediate reboiler is added, a heating amount of the reboiler is distributed to the tower bottom and a stripping intermediate section; after the intermediate condenser is added, a heat load of the condenser is distributed to the tower top and the distillation intermediate section.

* * * * *